US008636287B2

(12) United States Patent
Wienhold

(10) Patent No.: US 8,636,287 B2
(45) Date of Patent: Jan. 28, 2014

(54) AUTOMATIC TOOL-BIT HOLDER

(75) Inventor: James L. Wienhold, Minneapolis, MN (US)

(73) Assignee: Insty Bit Acquisition, LLC, Minneapolis, MN (US)

( * ) Notice: Subject to any disclaimer, the term of this patent is extended or adjusted under 35 U.S.C. 154(b) by 1063 days.

(21) Appl. No.: 12/296,837

(22) PCT Filed: Apr. 13, 2007

(86) PCT No.: PCT/US2007/009285
§ 371 (c)(1), (2), (4) Date: Aug. 19, 2009

(87) PCT Pub. No.: WO2007/120893
PCT Pub. Date: Oct. 25, 2007

(65) Prior Publication Data

US 2011/0101629 A1 May 5, 2011

Related U.S. Application Data

(60) Provisional application No. 60/791,849, filed on Apr. 13, 2006, provisional application No. 60/810,384, filed on Jun. 2, 2006.

(51) Int. Cl.
*B23B 31/107* (2006.01)

(52) U.S. Cl.
USPC ................ 279/75; 279/82; 279/905; 279/155

(58) Field of Classification Search
USPC ........... 279/75, 74, 82, 904, 905, 902, 22, 30, 279/155, 76, 80, 79
See application file for complete search history.

(56) References Cited

U.S. PATENT DOCUMENTS

| | | | | | |
|---|---|---|---|---|---|
| 1,112,349 | A * | 9/1914 | Barnes | ........................... | 279/74 |
| 3,622,169 | A * | 11/1971 | Koch et al. | ........................ | 279/76 |
| 5,016,892 | A * | 5/1991 | Lafforgue et al. | .............. | 279/82 |
| 5,779,404 | A | 7/1998 | Jore | | |
| 6,092,814 | A * | 7/2000 | Kageler | ........................ | 279/19.4 |
| 6,543,959 | B1 * | 4/2003 | Jore | ........................... | 403/322.2 |
| 6,695,321 | B2 | 2/2004 | Bedi et al. | | |
| 7,121,774 | B2 * | 10/2006 | Hirt et al. | ...................... | 408/240 |
| 7,287,449 | B2 * | 10/2007 | Abel et al. | ................... | 81/177.2 |
| 7,740,249 | B1 * | 6/2010 | Gao | ................................ | 279/75 |
| 2009/0160138 | A1 * | 6/2009 | Bohne | ............................. | 279/30 |

* cited by examiner

*Primary Examiner* — Eric A Gates
*Assistant Examiner* — Paul M Janeski
(74) *Attorney, Agent, or Firm* — James L. Young; Westman, Champlin & Koehler, P.A.

(57) ABSTRACT

A tool-bit holder has a hub, wherein the hub has a longitudinally extending axial bore for receiving a tool-bit therein, a detent ball radially projecting into the bore to selectively engage the tool-bit, and a circumferential ramp that is longitudinally moveable over the detent ball to cause radial movement thereof. A longitudinally moveable member extends through a slot in the hub and radially into the bore. The circumferential ramp is moveable as a function of longitudinal movement of the moveable member relative to the hub.

24 Claims, 22 Drawing Sheets

3B
3B
A
A'
1
2
3
4
6
8
10
10a
10b
10c
17
18
20
21
22
24
25
25a
26
27
30
31
32
36
38
40
42

1
2
4
10
10a
10b
14
15
16
17
18
20
22
24
26
30A
32A
36A
37
44
G
A
6B

AUTOMATIC TOOL-BIT HOLDER

CROSS-REFERENCE TO RELATED APPLICATION

The present application is based on and claims the benefit of U.S. provisional patent application Ser. No. 60/791,849, filed Apr. 13, 2006 and 60/810,384, filed Jun. 2, 2006, the contents of which are hereby incorporated by reference in their entireties.

BACKGROUND

The disclosure relates to holders for tool-bits, and more specifically those which are adapted to readily release a tool-bit that is being secured within the tool-bit holder.

Tool-bits are articles such as those used to form a bore in a workpiece (e.g., a drill bit) or used to secure or release a fastener (e.g., a screw, bolt, nut, etc.) onto a workpiece or complimentary fastener component, via rotation. A tool-bit generally has a polygon shaped tool shank and a driving end affixed to at least one end of the tool shank. The ability to use different driving ends during the same activity is beneficial to a user, hence the need for quickly replacing a tool-bit in a holder (or reversing its orientation in the holder). The ability to change the type of driving end extending from a tool-bit holder is known in the art, and it has been recognized as an advantageous feature.

SUMMARY

An improvement is disclosed for a tool-bit holder having a hub, wherein the hub has a longitudinally extending axial bore for receiving a tool-bit therein. The tool-bit holder has a detent ball radially projecting into the bore to selective engage the tool-bit, and has a circumferential ramp that is longitudinally moveable over the detent ball to cause radial movement thereof. The improvement comprises a longitudinally moveable member that extends through a slot in the hub and radially into the bore, wherein the circumferential ramp is moveable as a function of longitudinal movement of the moveable member relative to the hood.

In one aspect, this disclosure is an improvement to a tool-bit holder of the type having a hub, wherein the hub has a longitudinally extending axial bore for receiving a tool-bit therein. The hub also has a detent ball radially projecting into the bore to selectively engage the tool-bit, and a circumferential ramp that is longitudinally moveable over the detent ball to cause radial movement thereof. In this aspect, the improvement comprises a longitudinally moveable member that extends radially into the bore only to an extent sufficient to be engaged by a radially outwardly extending edge between portions of the tool-bit when the tool-bit is inserted in the bore, or when the circumferential ramp is moveable as a function of longitudinal movement of the moveable member relative to the hub.

In one aspect, the tool-bit holder is disclosed which comprises a hub, a sleeve longitudinally moveable along the hub. The hub has an axially extending bore for receiving a tool-bit therein, the bore-having a first polygon-shaped distal portion and a second circular-shaped proximal portion with a shoulder therebetween, wherein an edge of the tool-bit abuts the shoulder. The tool-bit holder comprises a first plurality of balls aligned within the sleeve for radially engaging the tool-bit through the hub and an inner ring within the sleeve, wherein the inner ring is axially moveable relative to the sleeve and relative to the hub. The tool-bit holder further comprises an inner ring spring biasing apart the sleeve and the hub, and a sleeve spring biasing apart the inner ring and sleeve wherein, upon insertion of the tool-bit into the bore to abut the shoulder, the inner ring, inner ring spring, sleeve spring and sleeve cooperate to urge the balls against the tool-bit.

In one aspect, a tool-bit holder is disclosed which comprises a hub for receiving a tool-bit within an axial bore thereof and a sleeve longitudinally moveable along the hub. The tool-bit holder also comprises an inner ring within the sleeve, wherein the inner ring is longitudinally moveable relative to the sleeve and relative to the hub, and at least one ball disposed between the sleeve and the hub and adapted to radially engage the tool-bit. The tool-bit holder further comprises a moveable member extending radially into the bore through a longitudinal slot in the hub, wherein proximal movement of the moveable member relative to the hub causes proximal movement of the inner ring. The tool-bit holder also comprises an inner ring spring biasing apart the sleeve and the hub, and a sleeve spring biasing apart the inner ring and the sleeve wherein, upon insertion of the tool-bit into the bore to engage the moveable member, the inner ring, inner ring spring, sleeve spring and sleeve cooperate to urge the ball against the tool-bit.

In one aspect, the disclosure relates to a method of utilizing the tool-bit. The method comprises inserting a tool-bit into a longitudinally extending bore in a hub and engaging a proximal moveable member with an edge of the tool-bit, wherein the proximal moveable member is disposed within an inner ring and wherein the proximal moveable member is received within a longitudinal slot in communication with the bore of the hub. The method also comprises moving the inner ring proximally as the function of the movement of the proximal moveable member such that an inner spring and a sleeve spring are compressed, and causing the sleeve spring to apply longitudinal forces to a sleeve such that the sleeve moves proximally along the hub, wherein the sleeve causes a force to be applied to a distal plurality of balls such that the balls are urged radially inwardly, each ball grasping a flat side of the tool-bit.

In one aspect, the disclosure relates to a method comprising inserting a tool-bit into a distal opening of a longitudinally extending bore in a hub, wherein the bore has a distal end and a proximal end, and engaging a longitudinally moveable proximal member with a portion of the tool-bit, whereby the proximal member moves proximally along a longitudinally extending slot in the hub adjacent the bore. The method further comprises moving a sleeve disposed about the hub proximally as a function of the proximal movement of the proximal member, and urging one or more distal detent balls radially inwardly into the bore, as a function of the proximal movement of the sleeve.

In another aspect, this disclosure relates to a tool-bit holder that has a hub with a bore extending axially therethrough, where the bore is adapted so that it can receive a tool-bit. The bore has a polygon-shaped distal portion and a circular-shaped proximal portion. The two portions of the bore are separated by a shoulder. A sleeve is disposed around the hub such that the sleeve is longitudinally moveable along the hub. A first plurality of distal detent balls are aligned within the sleeve for radially engaging the tool-bit through the hub. An inner ring is longitudinally moveably disposed between the sleeve and the hub, wherein the inner ring is axially moveable relative to both the sleeve and the hub. The tool-bit holder further includes a sleeve spring biasing apart the sleeve and the hub and an inner ring spring biasing apart the inner ring and the sleeve wherein, upon insertion of the tool-bit into the bore to abut the shoulder, the inner ring, inner ring spring, sleeve spring and sleeve cooperate to urge the distal detent balls against the tool-bit.

This Summary is provided to introduce a selection of concepts in a simplified form that are further described below in the Detailed Description. This Summary is not intended to identify key features or essential features of the claimed subject matter, is not intended to describe each disclosed embodiment or every implementation of the claimed subject matter, and is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

Figures 1A, 1B:
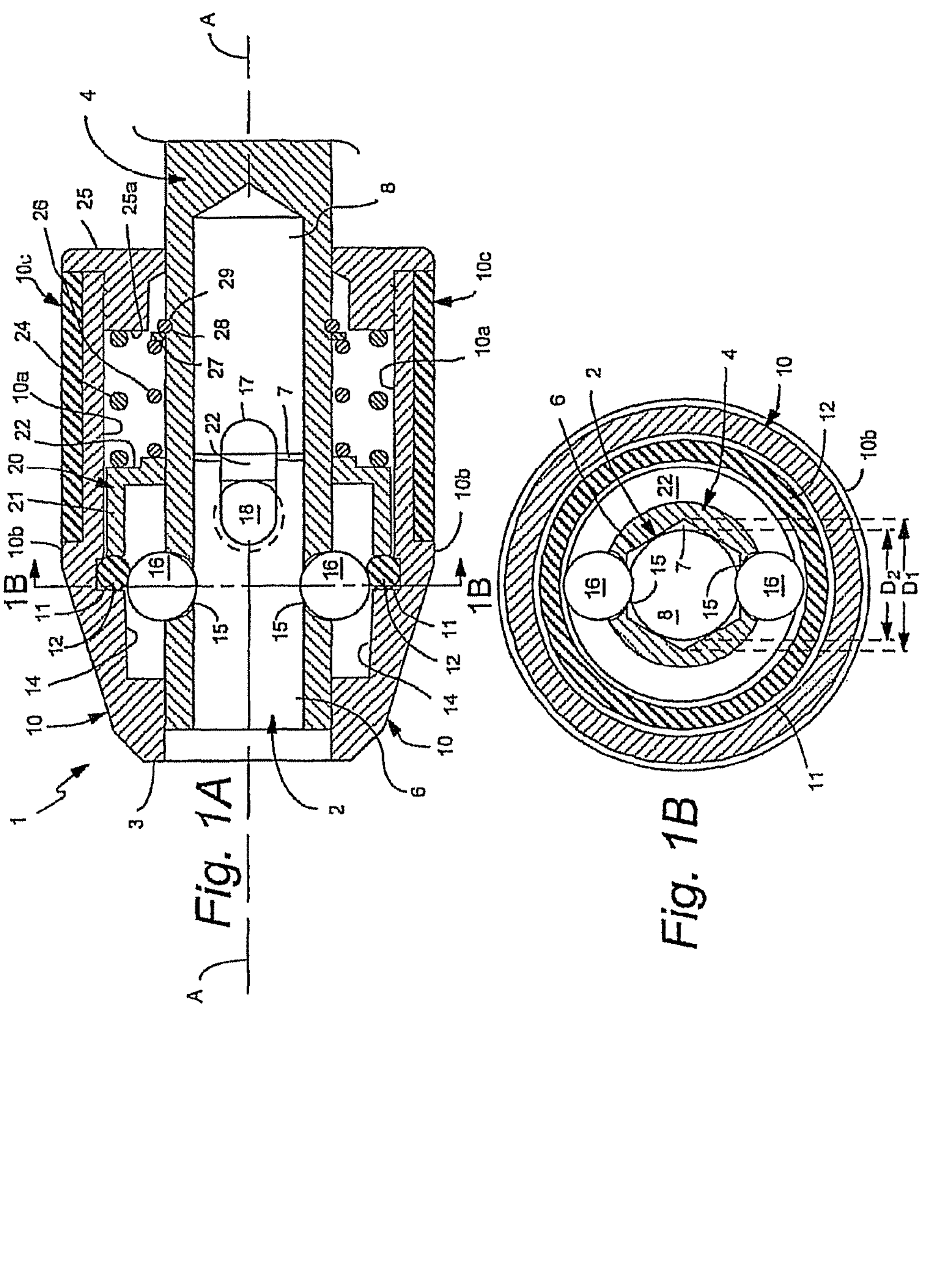
FIG. 1A shows a longitudinal sectional view of a first embodiment of a tool-bit holder, and illustrates the relative positions of one or more distal detent balls (not shown in section) and a spring-loaded sleeve when no tool-bit is inserted into the tool-bit holder.
FIG. 1B is a lateral sectional view, as taken along lines 1B-1B in FIG. 1A, illustrating positions of the distal detent balls (not shown in section) and the spring-loaded sleeve when no tool-bit is inserted into the tool-bit holder.

While the above-identified figures set forth several illustrative embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

DETAILED DESCRIPTION

This disclosure is directed to designs for a tool-bit holder that automatically capture a tool-bit as it is inserted into a bore of the holder. Tool-bit release is accomplished by activating a sleeve on the tool-bit holder between an unclamped or open position and a clamped or tool-bit capture position. The disclosed arrangements allow the tool-bit to be extracted from the tool-bit holder with a single hand of an operator. Typical tool-bit shanks having hex cross-sectional shapes are shown herein. However, any shank shape formed to inhibit rotation of the tool-bit relative to the tool-bit holder will suffice. A tool-bit may be single-ended or double-ended. Tool-bits with shanks that have a circumferential power groove can be accommodated by the disclosed too-bit holders; however, no power groove is necessary for effective automatic coupling and release of the tool-bit relative to the tool-bit holder.

The tool-bit holder may have a central hub with any suitable shape on its proximal end for rotatably coupled engagement with a handle or power source, using a direct connection or either a male or female style coupling.

Some illustrated embodiments of this disclosure show tool-bit holders with two distal detent balls and two proximal balls or pins, while other embodiments show three distal detent balls and three proximal balls. Tool-bit holder designs with combinations of one or more distal detent balls and one or more proximal balls or pins are contemplated (when a plurality of like balls or pins are employed, the balls or pins are typically equally spaced apart circumferentially about a central longitudinal axis of the tool-bit holder). In some embodiments, the tool-bit holder includes an inner ring that is longitudinally moveable within a sleeve (that is also longitudinally moveable relative to the hub of the tool-bit holder). The size and form of the inner ring may vary to mate with a particular selection of balls or pins, as illustrated by the exemplary embodiments disclosed herein.

Orientation of the distal detent balls is depicted in some of the drawings to mate with hexagon flats of a tool-bit shank. Alternately, the distal detent balls may be located to mate with the points of a hexagon or polygon-shaped tool-bit shank, or to engage a radially projecting edge of the tool-bit.

The force to clamp a tool-bit within the tool-bit holder is created by a spring-loaded ramp within a sleeve working over distal detent balls in contact a with tool-bit shank. The angle of the ramp relative to the tool-bit holder axis may vary by application, but is typically less than ten degrees relative to an axis of the bore of the holder.

FIG. 1A illustrates a longitudinal sectional view of a first embodiment of a tool-bit holder 1 having a longitudinal axis A, without a tool-bit inserted into the tool-bit holder 1. The tool-bit holder 1 is adapted to receive a tool-bit via an axially extending bore 2, disposed within a hub 4, wherein the bore 2 is open at a distal end 3 of the tool-bit holder 1. The bore 2 has a first polygon-shaped distal portion 6 (e.g., hex shaped) and a second circular-shaped proximal portion 8, with a radially inwardly extending shoulder 7 therebetween. As shown in FIG. 1B, the distal portion 6 has, at its greatest extent, a first radial dimension $D_1$, and the proximal portion 8 has a second radial dimension $D_2$, where $D_1$ is greater than $D_2$. The hub 4 is disposed within a sleeve 10 which is longitudinally movable along (e.g., over) the hub 4. The sleeve 10 has a longitudinal opening therethrough for receiving the hub 4 therein, and may be rotatable relative to the hub 4. In one embodiment, the sleeve 10 slidably mates with the hub 4 adjacent the distal end 3 of the tool-bit holder 1, and has a proximal cap 25 affixed to a proximal end of the sleeve 10, with the cap 25 slidably mating with the hub 4. An inner face 10*a* of the sleeve 10 has an inner circumferential groove 11 adapted to receive an O-ring 12 therein. The inner face 10*a* includes a circumferential ramp 14 extending distally from the O-ring 12. An outer face 10*b* of the sleeve 10 may have a grip-enhancing layer or coating thereon, such as grip tube 10*c*.

The hub 4 has one or more holes 15 therethrough, aligned in the distal portion 6 thereof, as seen in FIGS. 1A and 1B. A detent ball 16 is disposed within each hole 15, between the hub 4 and the sleeve 10. The diameter of each ball 16 is sized relative to an inner diameter of its respective hole 15 so that a portion of the ball 16 can extend through its hole 15 and into the bore 2, but so that the entire ball 16 cannot pass through its hole 15 into the bore 2.

Figures 2A, 2B:
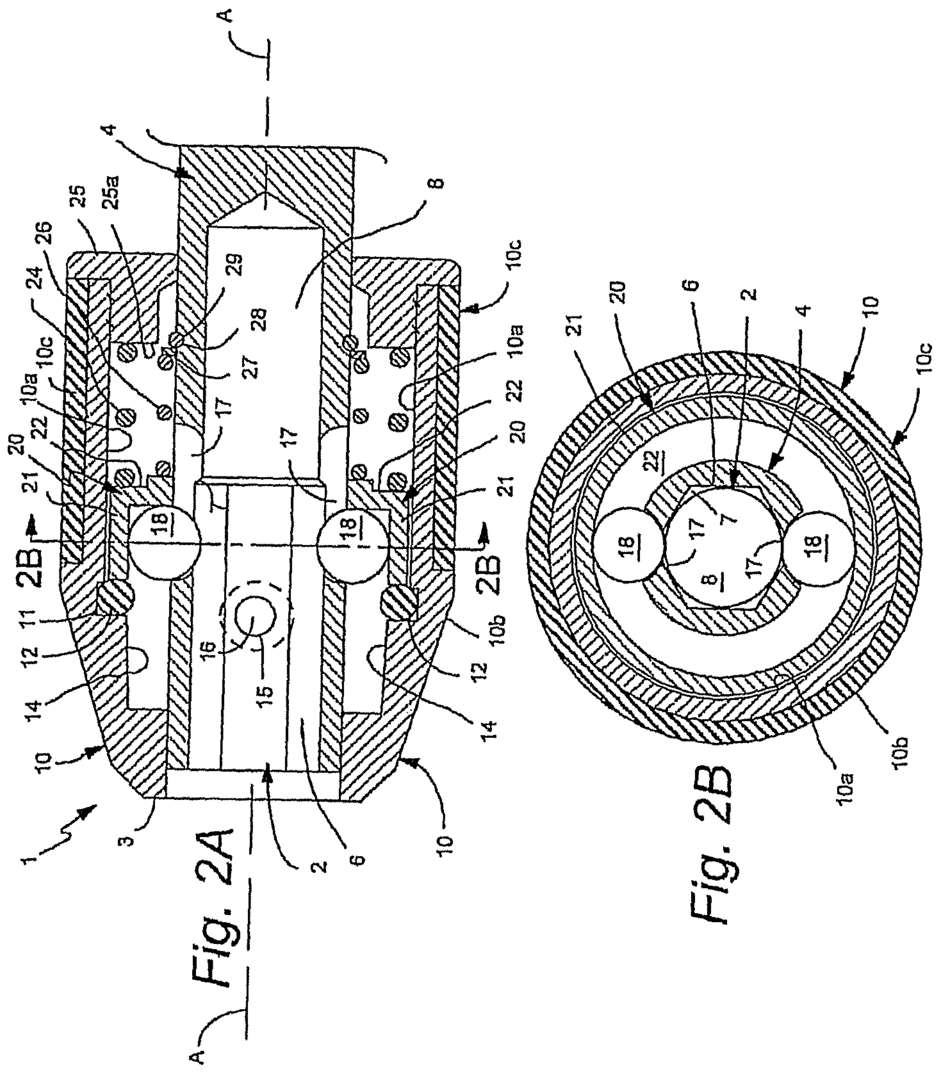
FIG. 2A shows a longitudinal sectional view of the tool-bit holder of FIG. 1A with the assembly rotated 90° on its longitudinal axis, and illustrates the relative positions of one or more proximal moveable balls (not shown in section) and a spring-loaded inner ring when no tool-bit is inserted into the tool-bit holder.
FIG. 2B is a lateral sectional view, as taken along lines 2B-2B in FIG. 2A, illustrating positions of the proximal balls (not shown in section) and the spring-loaded inner ring when no tool-bit is inserted into the tool-bit holder.

FIG. 2A depicts the longitudinal sectional view of the first embodiment in FIG. 1A, rotated 90 degrees on its longitudinal axis A. The hub 4 has one or more longitudinally extending slots 17 therethrough, aligned to span the shoulder 7 between the distal portion 6 and the proximal portion 8 of the bore 2, as seen in FIGS. 2A and 2B (while the slots shown herein are linear, in some embodiments helically arranged slots are contemplated). A ball 18 is disposed within each slot 17, between the hub 4 and the sleeve 10. The diameter of each ball 18 is sized relative to a shorter inner circumferential dimension of its respective slot 17 so that a portion of the ball 18 extends radially through its slot 17 and into the bore 2, but so that the entire ball 18 cannot pass through its slot 17 into the bore 2.

An inner ring 20 is disposed between the hub 4 and the sleeve 10, adjacent the one or more slots 17 and respective balls 18. As seen in FIG. 2A, the inner ring 20 has a circumferential outer wall 21 that extends radially outside each ball 18 to retain the ball 18 within its respective slot 17. Thus, while each ball 18 can move longitudinally within its slot 17, its radial position relative to the axis A of the bore 2 is fixed. In one embodiment, each ball 18 extends into the bore 2 only to an extent sufficient to be engaged by a proximal radially outwardly extending edge of a tool-bit that may be inserted in the bore 2, as explained below. The inner ring 20 also has, connected to the outer wall 21, a radially extending proximal wall 22 that abuts a proximal side of each ball 18.

An outer biasing element or sleeve spring 24 (such as, e.g., a helical spring) extends in compression between the proximal wall 22 of the inner ring 20 and a proximal spring abutment face 25*a* on the proximal cap 25 of the sleeve 10. The spring 24 urges the inner ring 20 distally relative to the sleeve 10. An inner biasing element or inner ring spring 26 (such as, e.g., a helical spring) extends in compression between the proximal wall 22 of the inner ring 20 and a proximal spring abutment surface 27 of (or affixed to) the hub 4. In the embodiment illustrated in FIG. 2A, the surface 27 is defined by a ring extending about the hub 4 and retained from proximal movement relative to the hub 4 by a C-claim 28 (or other suitable retainer) within a circumferential groove 29 on the hub 4. In one embodiment, the inner ring spring 26 has a smaller diameter than the sleeve spring 24, and is disposed coaxially within the sleeve spring 24.

Figures 3A, 3B:
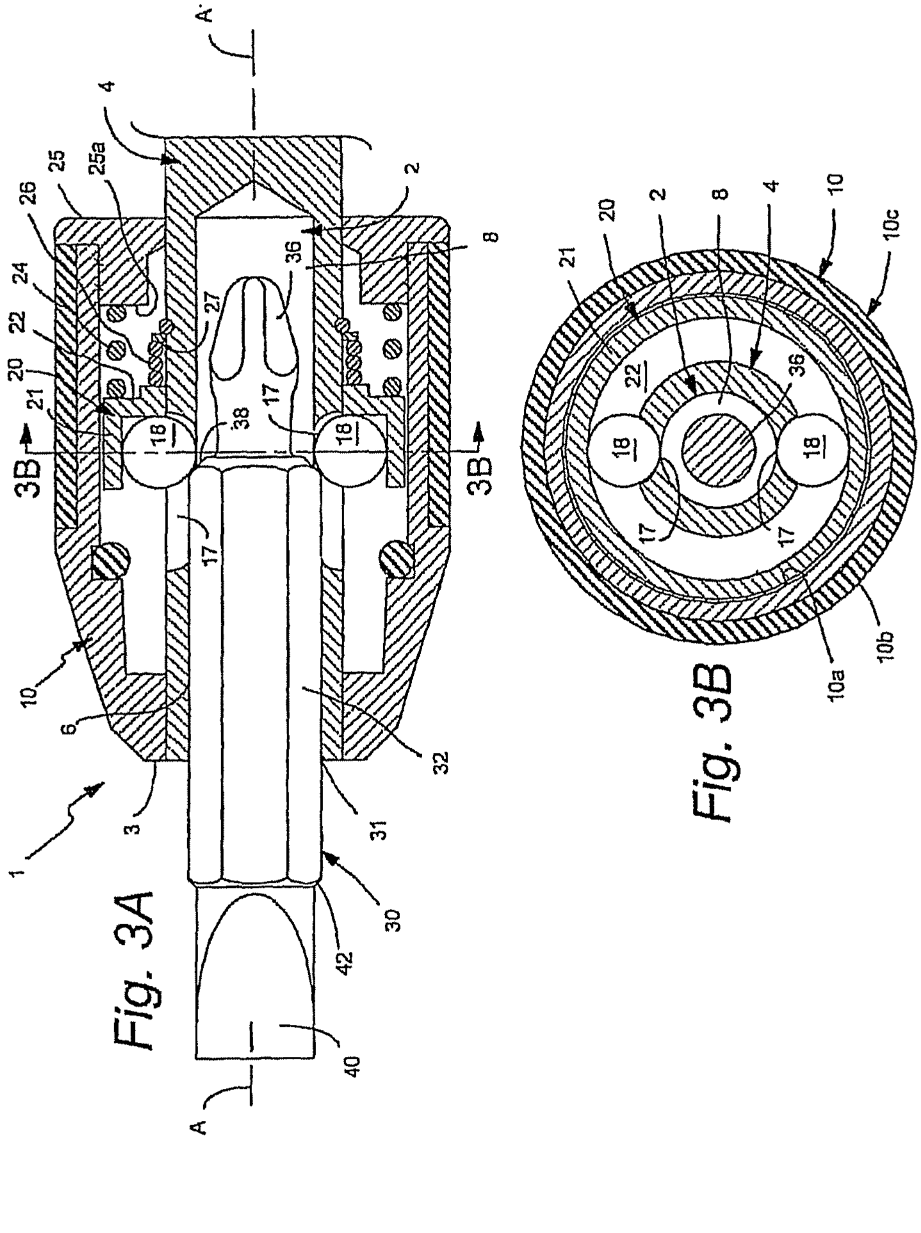
FIG. 3A shows a longitudinal sectional view of the tool-bit holder of FIG. 2A with a double-ended tool-bit inserted therein. A first elongated end of the tool-bit is inserted into the bore of the tool-bit holder (the tool-bit and the proximal balls are not shown in section). The tool-bit has a hex-shaped shank that mates with a hex-shaped distal portion of the bore in the tool-bit holder. A proximal end of the tool-bit's hex-shaped shank abuts shoulder portions at a proximal end of the distal portion of the bore, thereby fixing the depth of insertion of the tool-bit into the tool-bit holder. A proximal portion of the bore is a circular bore, which is sized to at least accommodate the first elongated end of the tool-bit therein.
FIG. 3B is a lateral sectional view, as taken along lines 3B-3B in FIG. 3A, illustrating positions of the proximal balls (not shown in section) and the spring-loaded inner ring with the double-ended tool-bit inserted into the tool-bit holder.

FIG. 3A shows the same view as FIG. 2A, with a tool-bit 30 inserted into the tool-bit holder 1. The tool-bit 30 is inserted into a distal opening 31 of the bore 2 such that a polygon-shaped shank 32 (e.g., a hex-shaped shank) of the tool-bit 30 aligns with the polygon-shaped distal portion 6 of the bore 2, and a first tool-bit end 36 extends into the circular-shaped proximal portion 8 of the bore 2 (see FIG. 3B). A proximal radially outwardly extending edge of the tool-bit 30, such as first edge 38 between the polygon-shaped portion 32 and the first tool-bit end 36, abuts the shoulder 7 within the bore 2, thereby fixing the depth of insertion of the tool-bit 30 into the tool-bit holder 1. In one embodiment, the radially outwardly extending edge of the tool-bit comprises one or more end faces of corners of a hex-shaped shank portion of the tool-bit. When so assembled, a second tool-bit end 40 of the tool-bit 30 thus extends outwardly from the tool-bit holder 1 for manipulation as desired by an operator.

As is apparent, the tool-bit 30 may be inserted into the tool-bit holder 1 so that the first tool-bit end 38 is exposed for use at the distal end 3 of the tool-bit holder 1. In this instance, the proximal edge of the tool-bit 30 that engages the shoulder 7 is then the second edge 42 (see FIG. 3A) between the polygon-shaped portion 32 and the second tool-bit end 40.

Upon insertion of the tool-bit 30 into the tool-bit holder 1, and prior to engaging the shoulder 7, the proximal edge of the tool-bit 30 engages a proximal moveable member, such as the one or more balls 18. As seen in a comparison of FIGS. 2A and 3A, each ball 18 is moved within its respective slot 17 from a distal position (FIG. 2A) when no tool-bit 30 has been inserted in the bore 2 to a proximal position (FIG. 3A) when the tool-bit 30 has been fully inserted in the bore 2. The tool-bit 30 may be inserted proximally until the proximal edge of the tool-bit 30 engage the shoulder 7 of the bore 2 (in FIG. 3A, edge 38 engages shoulder 7). The proximal movement of the balls 18 causes the inner ring 20 to move proximally relative to the hub 4, against the bias of the inner ring spring 26, thereby further compressing the inner ring spring 26 between the proximal wall 22 and the spring abutment surface 27 (compare the relative positions of the inner ring 20 and the sleeve 10 in FIGS. 2A and 3A). Such proximal movement of the inner ring 20 also further compresses the sleeve spring 24 between the proximal wall 22 and the spring abutment face 25*a*, thereby urging the sleeve 10 in a proximal direction relative to the hub 4 (compare the relative positions of the sleeve 10 and the hub 4 in FIGS. 2A and 3A).

Figure 4A:
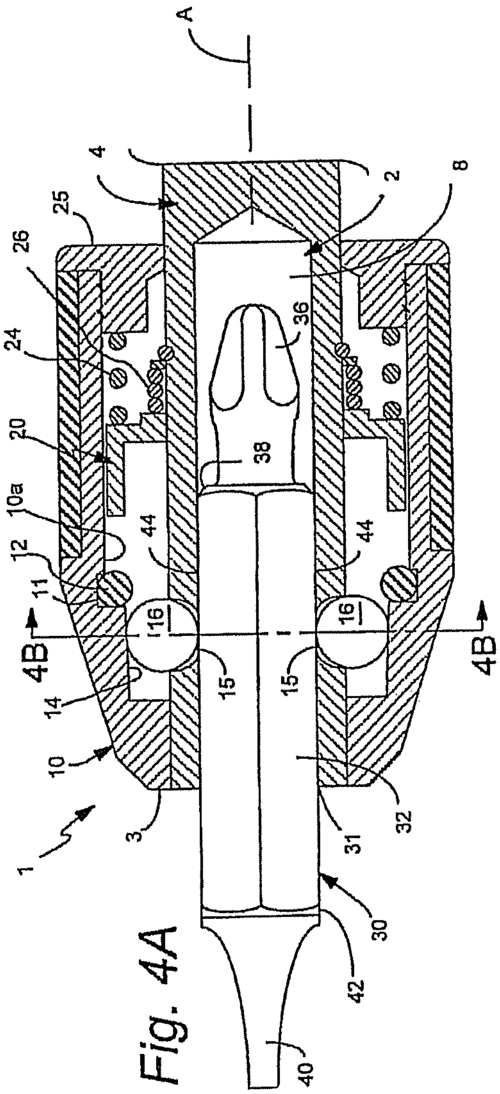
FIG. 4A shows the same view as FIG. 3A, with the assembly rotated 90° on its longitudinal axis (back to the orientation of FIG. 1A), illustrating positions of the distal detent balls and spring-loaded sleeve with the double-ended tool-bit inserted into the tool-bit holder (the tool-bit and the distal detent balls are not shown in section).
Figure 4B:
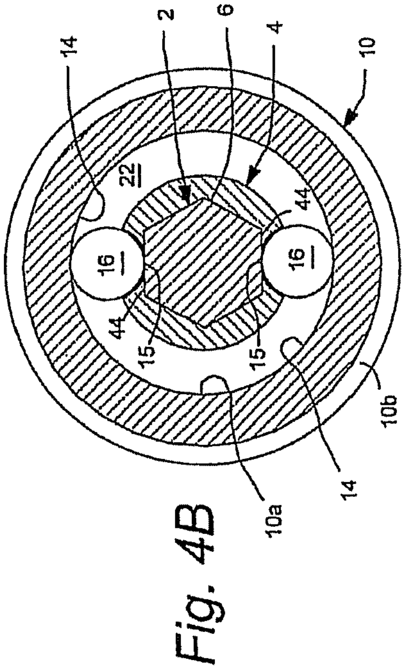
FIG. 4B is a lateral sectional view, as taken along lines 4B-4B in FIG. 4A, illustrating positions of the distal detent balls and the spring-loaded sleeve with double-ended tool-bit inserted into the tool-bit holder (the distal detent balls are not shown in section).

The effect of such relative proximal movement of the sleeve 10 with respect to the hub 4 upon the one or more detent balls 16 is illustrated in FIG. 4A (which is a longitudinal sectional view like that of FIG. 1A). The ramp 14 on the inner face 10*a* of the sleeve 10 engages a radially outer edge of each detent ball 16. As the ramp 14 extends distally from the O-ring 12, its radial distance from the axis A is reduced to define an inner conical frustum surface. Thus, the more proximally that the sleeve 10 is moved, the more the ramp 14 urges each detent ball 16 radially inwardly through its respective hole 15 and into the distal portion 6 of the bore 2. As seen in FIGS. 4A and 4B, each detent ball 16 is thus urged into engagement with a flat face 44 of the polygon-shaped portion 32 of the tool-bit 30 to grasp the tool-bit 30 within the tool-bit holder 1. The tool-bit 30 cannot be removed from the tool-bit holder 1 until the force urging each of the detent balls 16 radially inwardly against the tool-bit 30 is relieved.

In use, the tool-bit holder 1 of the first embodiment operates in the following manner. Before insertion of a tool-bit 30 into the bore 2, the sleeve 10 is in a distally extended or open position. An operator places a tool-bit 30 into the distal opening 31 of the bore 2 of the hub 4 and moves it inward or proximally (to the right as seen in FIG. 3A) past the detent balls 16 which are free to move radially outwardly from distal portion 6 of the bore 4 due to the distal position of the sleeve 10 and its ramp 14 (see, e.g., FIGS. 1A and 2A (without tool)). As proximal travel of the tool-bit 30 continues into the bore 2, the proximal edge of the tool-bit 30 (the proximal end faces of the shank 32 of the tool-bit 30) contacts the balls 18. The balls 18 are captured between the end faces of shank 32 of the tool-bit 30 and an annular cavity defined within the inner ring 20. As tool-bit movement proximally is continued, the balls 18 are pushed proximally by the tool-bit 30, moving within their respective longitudinal slots 17 in the hub 4. Proximal movement from the balls 18 is transferred to the inner ring 20 via engagement of each ball 18 within the proximal wall 22 of the inner ring 20. As the inner ring 20 moves proximally, it compresses both the inner ring spring 26 and the sleeve spring 24. Proximal movement of the tool-bit 30 is stopped when the end faces of the shank 32 contact the shoulder 7 at a distal end of the circular bore 8 (again, compare FIGS. 2A and 3A). The sleeve spring 24 applies longitudinal force to the sleeve 10 causing it to move proximally along the hub 4. As the sleeve 10 is moved proximally relative to the hub 4, the ramp 14 on the sleeve 10 contacts each of the balls 16 and progressively forces each ball 16 radially inwardly and eventually into contact with a respective flat face 44 of the shank 32 of the tool-bit 30 (see, e.g., FIGS. 4A and 4B). The force of the sleeve spring 24 and the wedging action of the ramp 14 of the sleeve 10 combine to create a state of tool-bit clamping, frictionally fixing the tool-bit 30 from longitudinal movement within the hub 4. When the tool-bit 30 is clamped it maintains the position of the chain of interacting parts and the sleeve spring 24 remains compressed to maintain the clamped state (compare FIGS. 3A and 4A). The sleeve 10 is thus in a retracted or tool-bit capture position.

To extract the tool-bit 30 from the tool-bit holder 1, the sleeve 10 is activated by manually pulling it outwardly or distally (to the left, as seen in FIG. 3A) relative to the hub 4. This overrides the force of the sleeve spring 24 and moves the surface of ramp 14 away from the balls 16, thereby allowing the balls 16 to move radially outwardly. The tool-bit 30 is urged distally along the bore 2 by the pressures of the sleeve spring 24 and the inner ring spring 26 transferred through the inner ring 20 and the balls 18 against the end faces of the shank 32 of the tool-bit 30. This tool-bit ejecting movement continues until the balls 18 reach the distal ends of their respective slots 17 in the hub 4.

Figure 5:
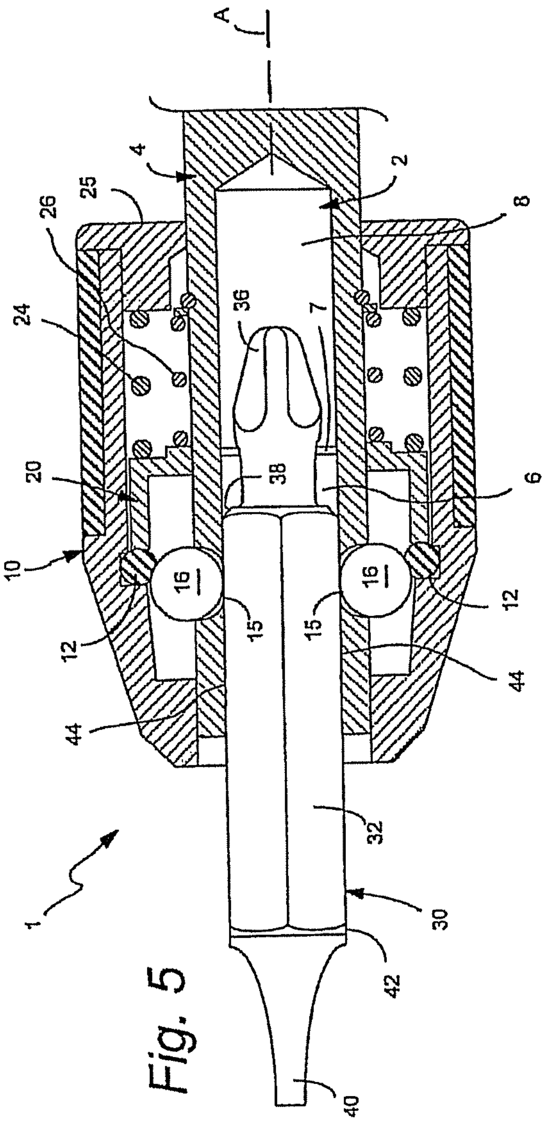
FIG. 5 shows a longitudinal sectional view of the tool-bit holder of FIG. 4B, illustrating the double-ended tool-bit unclamped, partially ejected and ready for removal by an operator (the tool-bit and distal detent balls are not shown in section).

At the same time that the sleeve 10 is moved distally to an open position, the O-ring 12 in the sleeve 10 is positioned against the detent balls 16 and applies moderate radially inward force to the balls 16. FIG. 5 is a longitudinal sectional view of the tool-bit holder 1 (as seen in FIGS. 1A and 4A), and shows the position of the O-ring 12 over the detent balls 16 with a double-ended tool-bit 30 unclamped, partially ejected and ready for removal by an operator. The O-ring 12 provides a radially inward force against each of the detent balls 16. The balls 16 are in turn biased against the flat faces 44 of the shank 44 of the tool-bit 30. This causes dampening and retention of the tool-bit 30 until an operator is ready to grasp the tool-bit 30 for its removal from the hub 4 of the tool-bit holder 1. The sleeve 10 remains in its distally extended or open position (e.g., FIGS. 1A and 2A), making the assembly inherently ready far insertion of the next tool-bit.

Figures 6A, 6B:
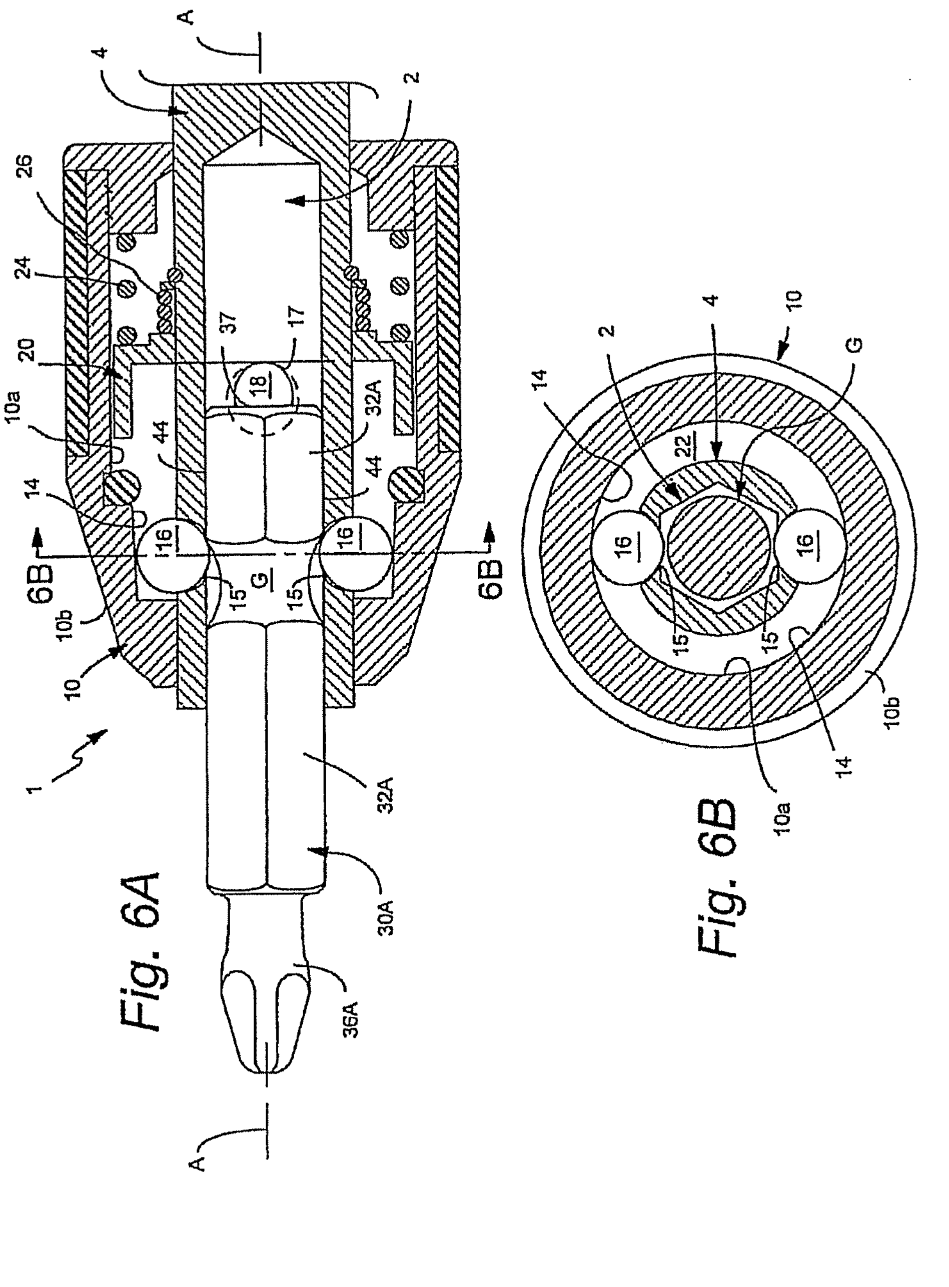
FIG. 6A shows a longitudinal sectional view of the tool-bit holder of FIGS. 1A-5, illustrating the position of the distal detent balls when a single-ended tool-bit is inserted into the tool-bit holder, where the tool-bit has a circumferential power groove around the circumference of the tool-bit's shank (the distal detent balls and the tool-bit are not shown bisection).
FIG. 6B is a lateral sectional view, as taken along lines 6B-6B in FIG. 6A, illustrating the distal detent balls in the power groove of the tool-bit (the distal detent balls are not shown in section).

FIG. 6A is a longitudinal sectional view of the tool-bit holder of FIGS. 1A-5, and shows the position of the distal detent balls 16 and sleeve 10 when a single-ended tool-bit 30A inserted in the bore 2. In this instance, the single-ended tool-bit 30A has a circumferential power groove G around the circumference of its polygon-shaped shank 32A (e.g., a hex-shaped shank), and has a tool-bit end 36A and a flat opposite end 37. The proximal edge of the tool-bit 30A that thus engages the shoulder 7 (FIG. 2A) in the bore 2 (and also the one or more proximal balls 18) comprises one or more end faces of corners of the shank 32A, adjacent its flat end 37. FIG. 6B is a lateral sectional view, as taken along lines 6B-6B in FIG. 6A. As seen, the distal detent balls 16 are urged by the ramp 14 on the sleeve 10 into the circumferential power groove G of the tool-bit 30A, rather than against the flat faces of the tool-bit's shank.

Figure 7:
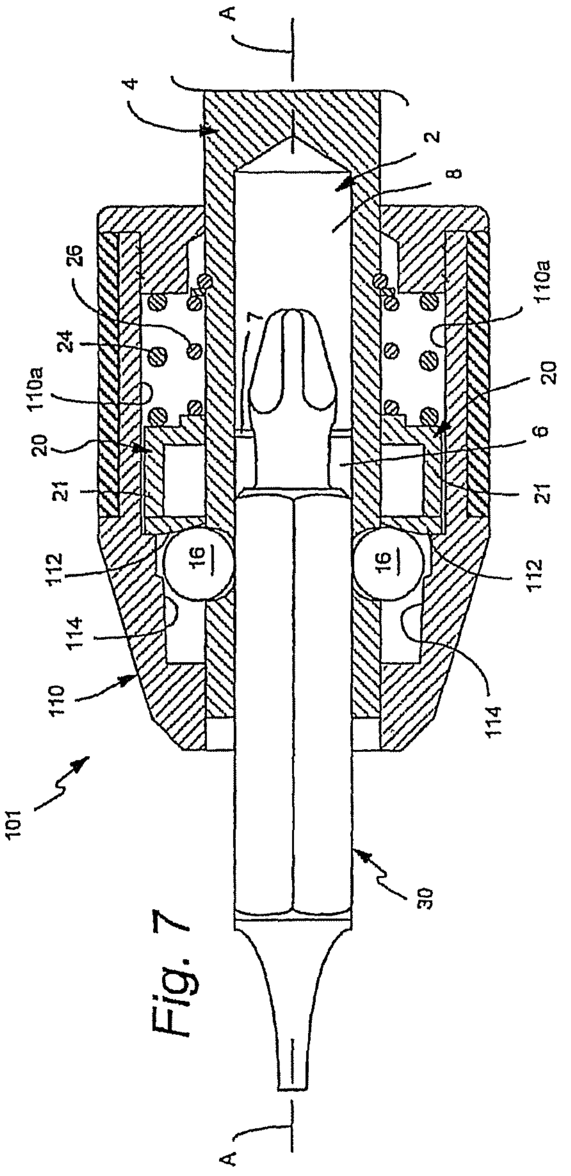
FIG. 7 shows a longitudinal sectional view of an alternative embodiment of a tool-bit holder, with a washer provided to apply dampening and retention forces by the distal detent balls to the tool-bit during ejection of the tool-bit from the tool-bit holder (the distal detent balls and the tool-bit are not shown in section).
Figure 8A:
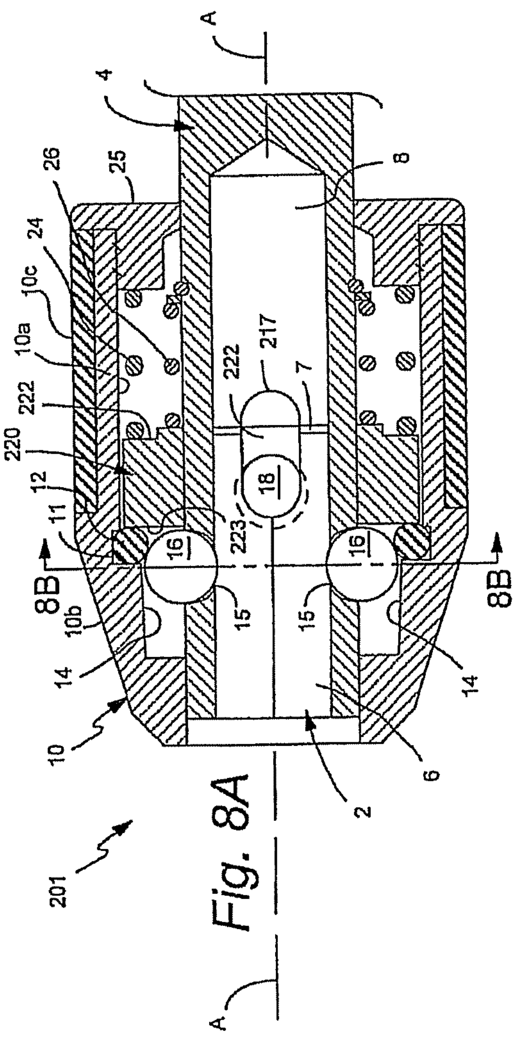
FIG. 8A shows a longitudinal sectional view of another embodiment of a tool-bit holder, without a tool-bit inserted into the tool-bit holder, illustrating the relative positions of one or more distal detent balls (not shown in section) and a spring-loaded sleeve when no tool-bit is inserted into the tool-bit holder.
Figure 8B:
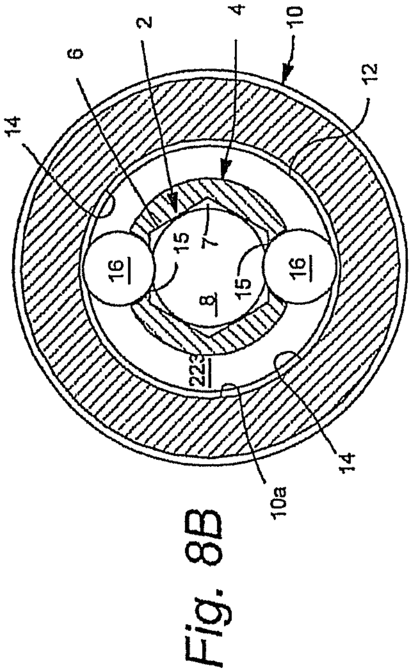
FIG. 8B is a lateral sectional view, as taken along lines 8B-8B in FIG. 8A, illustrating positions of the distal detent balls (not shown in section) and the spring-loaded sleeve when no tool-bit is inserted into the tool-bit holder.
Figures 9A, 9B:
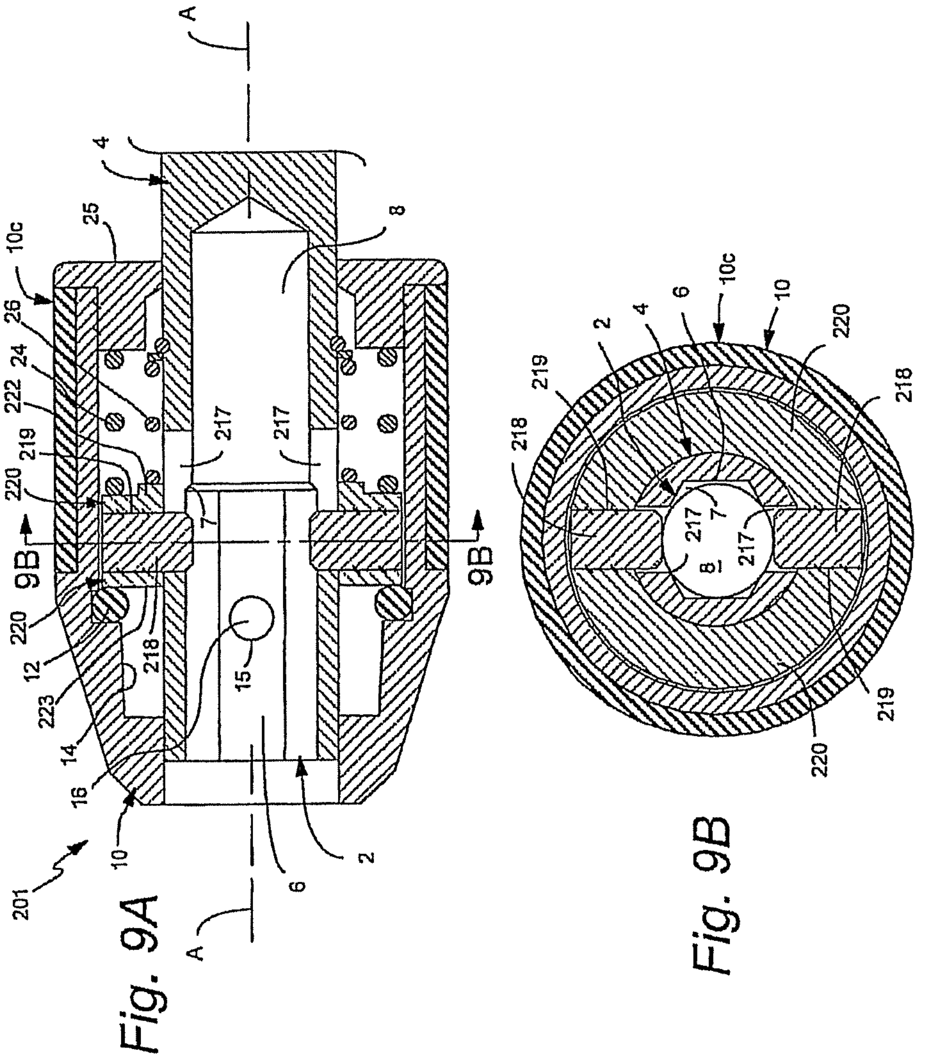
FIG. 9A shows a longitudinal sectional view of the tool-bit holder of FIG. 8A with the assembly rotated 90° on its longitudinal axis, and illustrates the relative positions of one or more proximal moveable pins and a spring-loaded inner ring when no tool-bit is inserted into the tool-bit holder.
FIG. 9B is a lateral sectional view as taken along lines 9B-9B in FIG. 9A, illustrating positions of the proximal pins and the spring-loaded inner ring when no tool-bit is inserted into the tool-bit holder.

FIG. 7 is a longitudinal sectional view of another embodiment of a tool-bit holder 101, with an alternate means (from that shown in FIG. 5) of applying dampening and retention forces to the tool-bit 30 by the distal detent balls 16 during ejection of the tool-bit 30A from the tool-bit holder 101. In this embodiment, a washer 112 is urged distally against the distal detent balls 16 by the outer wall of the inner ring 20, rather than using an O-ring to achieve that function. An inner face 110*a* of a sleeve 110 (including circumferential ramp 114) is shaped to accommodate the washer 112. It is also contemplated that the features of the washer 112 may be incorporated into the shape and construction of the inner ring 20 as a single component, in some embodiments. In use, the tool-bit holder 101 of FIG. 7 works like the embodiment of FIGS. 1A-6B, except that the washer 112 urges the distal detent balls 116 radially inwardly into the distal portion 6 of the bore 2, rather than using an O-ring to do so.

FIGS. 8A-11B illustrate another embodiment of a tool-bit holder 201 of this disclosure. The structure of the tool-bit holder 201 is the same as tool-bit holder 1, except for the configuration of its inner ring, and the substitution of one or more radially disposed pins coupled to the inner ring (rather than balls such as balls 18). As seen in FIGS. 9A and 9B, in this embodiment one or more pins 218 are affixed within respective bores 219 in an inner ring 220. The inner ring 220 has a radially extending proximal surface 222 which abuts sleeve spring 24 and inner ring spring 26, and a radially extending distal surface 223 which, when the inner ring 220 has been urged distally by the springs 24 and 26 relative to the hub 4, may abut the O-ring 12.

Figures 10A, 10B:
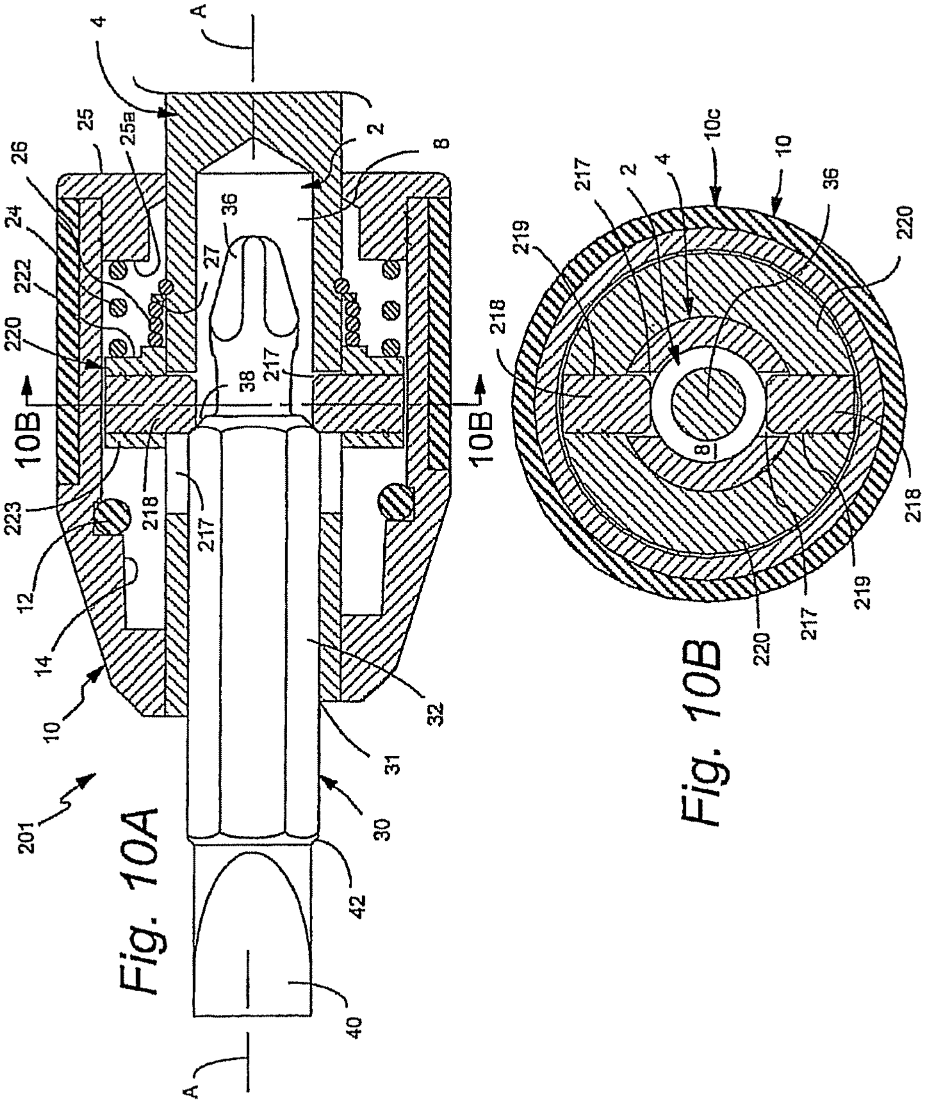
FIG. 10A shows a longitudinal sectional view of the tool-bit holder of FIG. 9A with a double-ended tool-bit inserted therein. A first elongated end of the tool-bit is inserted into the bore of the tool-bit holder (the tool-bit is not shown in section). The tool-bit has a hex-shaped shank that mates with a hex-shaped distal portion of the bore in the tool-bit holder. A proximal end of the tool-bit's hex-shaped shank abuts shoulder portions at a proximal end of the distal portion of the bore, thereby fixing the depth of insertion into the tool-bit into the tool-bit holder. A proximal portion of the bore is a circular bore, which is sized to at least accommodate the first elongated end of the tool-bit therein.
FIG. 10B is a lateral sectional view as taken along lines 10B-10B in FIG. 10A, illustrating positions of the proximal pins and the spring-loaded inner ring with the double-ended tool-bit inserted into the tool-bit holder.
Figures 11A, 11B:
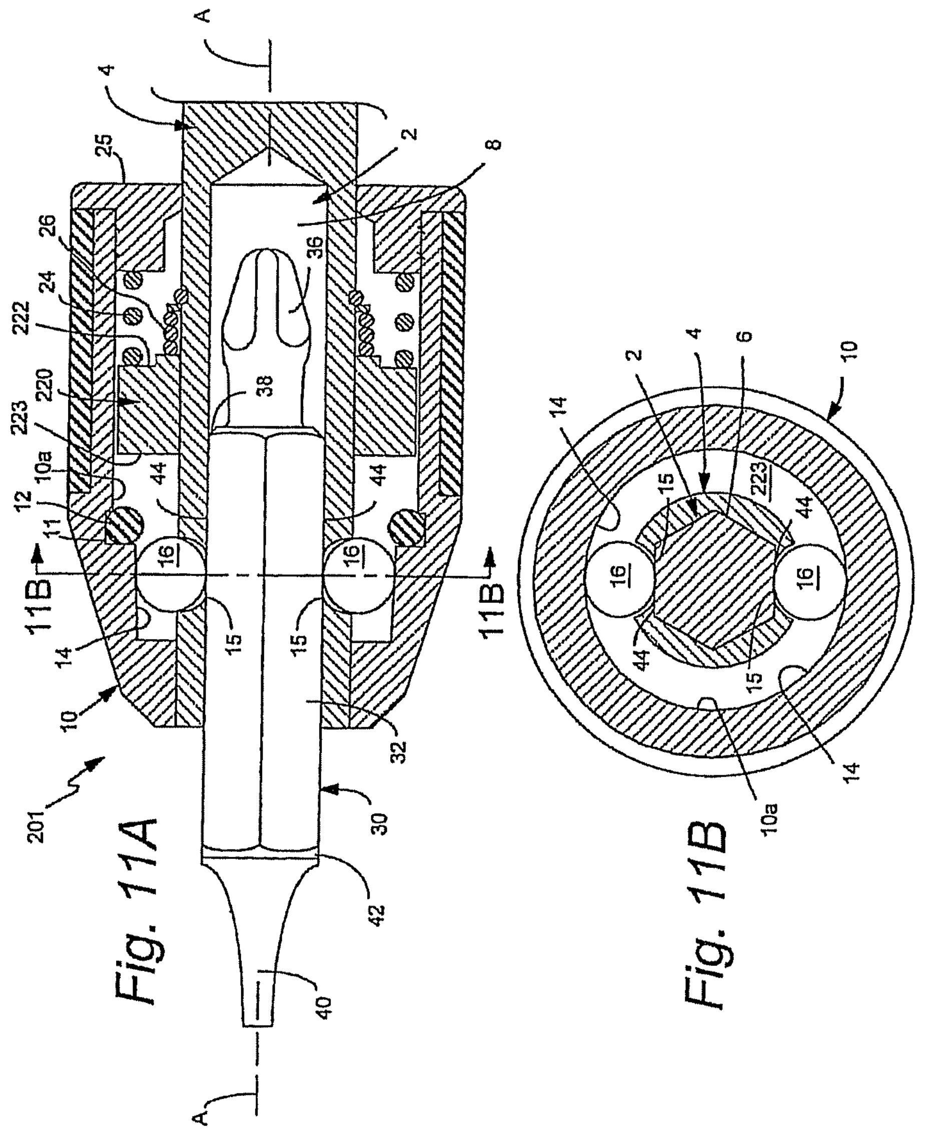
FIG. 11A shows the same view as FIG. 10A, with the assembly rotated 90° on its longitudinal axis (back to the orientation of FIG. 8A), illustrating positions of the distal detent balls and the spring-loaded sleeve with the double-ended tool-bit inserted into the tool-bit holder (the tool-bit and the distal detent balls are not shown in section).
FIG. 11B is a lateral sectional view as taken along lines 11B-11B in FIG. 11A, illustrating positions of the distal detent balls and the spring-loaded sleeve with the double-ended tool-bit inserted into the tool-bit holder (the distal detent balls are not shown in section).

Each pin 218 extends through a respective slot 17 in the hub 4, with each slot 217 being in communication with the bore 2. In one aspect, the slot 217 differs from the slot 17 (see FIGS. 2A and 2B) in that because it is not being used to prevent a ball from fully entering the bore 2, the slot 217 may be of continuous size as it extends radially through the hub 4. Each pin 218 is press-fit within its respective bore 219 in the inner ring 220, and thus fixed in place relative to its radial extent into the bore 2. Therefore, the shape of the slot 217 is not a design concern with respect to the function of preventing the pin from moving radially inwardly relative to the bore 2. As seen in FIG. 10A, for example, the radially innermost surface of each pin 218 is aligned to permit insertion of an end of the tool-bit 30 (such as end 36) past the pin 218 and into the proximal portion 8 of the bore 2.

FIGS. 8A, 8B, 9A and 9B illustrate the tool-bit holder 201 without a tool-bit inserted therein (like FIGS. 1A, 1B, 2A and 2B). FIGS. 10A, 10B, 11A and 11B illustrate the tool-bit holder 201 with a double-ended tool-bit 30 inserted therein (like FIGS. 3A, 3B, 4A and 4B). In this embodiment, as the tool-bit 30 is inserted proximally into the bore 2, the proximal edge 38 of the shank 32 of the tool-bit 30 first engages a radially inner edge 218*a* of each pin 218. Continued further proximal insertion of the tool-bit 30 thus likewise forces each pin 218 to move proximally relative to the hub 4, carrying the inner ring 220 with it. This compresses the springs 24 and 26 and, as a result, causes proximal movement of the sleeve 10. As discussed above, such proximal movement of the sleeve 10 relative to the hub 4 brings the ramp 14 into engagement with the distal detent balls 16, forcing them inwardly against the flat faces 44 of the shank 32 of the tool-bit 30. The extent of proximal insertion of the tool-bit 30 into the bore 2 is again limited by abutment of the proximal edge 38 of the shank 32 with the shoulder 7 of the bore 2. In use, the tool-bit holder 201 of FIGS. 8A-11B works like the tool-bit holder 1 of FIGS. 1A-5, except that the proximal pins 218 serve as an interface between the tool-bit 30 and the sleeve 10 rather than one or more balls (such as the balls 18 shown in FIGS. 3A and 3B).

Figure 12A:
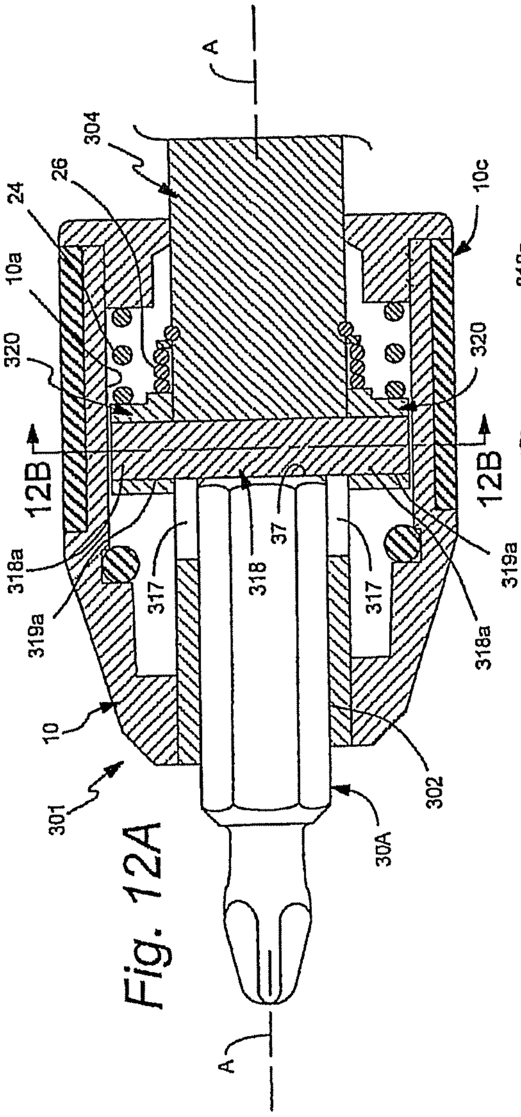
FIG. 12A is a longitudinal sectional view of an alternative embodiment of a tool-bit holder of FIGS. 8A-11B, illustrating a single proximal moveable pin extending through two opposed slots in the hub and into the inner ring (the single-ended tool-bit is not shown in section).
Figure 12B:
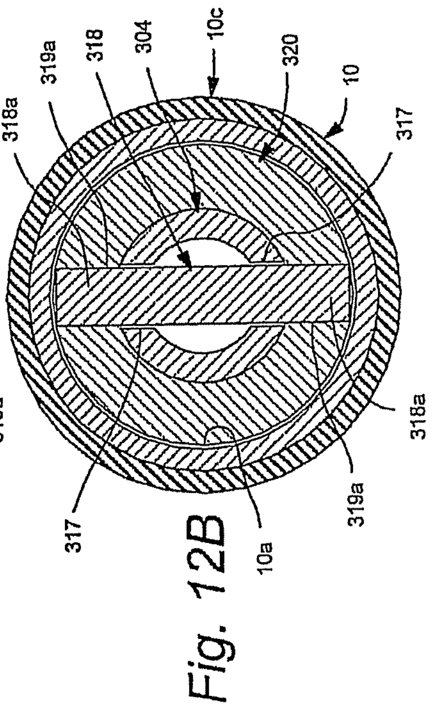
FIG. 12B is a lateral sectional view, as taken along lines 12B-12B in FIG. 12A, illustrating the single proximal pin extending across the both of the hub, through slots in the hub, and terminating within the inner ring.

FIG. 12A is a longitudinal sectional view of an alternate embodiment of a tool-bit holder 301 like the tool-bit holder 201 of FIGS. 8A-11B, but having a single radially disposed and moveable proximal pin 318 extending across a bore 302 of a hub 304. The proximal pin 318 extends through two slots 317 on opposite sides of the hub 304. Ends 318*a* of the proximal pin 318 are fixed within respective bores 319*a* in an inner ring 320. A single-ended tool-bit 30A is received within the bore 302. Upon insertion, the proximal end 37 of the tool-bit 30A contacts the proximal pin 318, and thus the pin 318 is forced in an axially proximal direction such that the inner ring spring 26 and the sleeve spring 24 are compressed by like movement of the inner ring 320. As discussed above, this action causes radial inward motion of one or more distal detent balls such that the detent balls grasp the tool-bit 30A and secure it within the tool-bit holder 301. FIG. 12B is a lateral sectional view, as taken along lines 12B-12B in FIG. 12A showing the single proximal pin 318 running through slots 317 in the hub 304 and terminating within the bores 319*a* of the inner ring 320. The single pin 318, when moved longitudinally relative to the bore 302, thus travels simultaneously in the two opposed slots 317, 317. In use, the tool-bit holder 301 of FIGS. 12A and 12B works like the tool-bit holder 201 of FIGS. 8A-11B, except that a proximal end of the single-ended tool-bit bottoms out on the single proximal pin 318 to cause sleeve movement proximally and consequent locking engagement of distal detent balls against the tool-bit. Other than these differences in form and function, the tool-bit holder 301 of FIGS. 12A and 12B operates the same as the tool-bit holder 1 illustrated in FIGS. 1A-7 in terms of receiving, grasping and releasing a single-ended tool-bit, such as the tool-bit 30A illustrated.

Figure 13A:
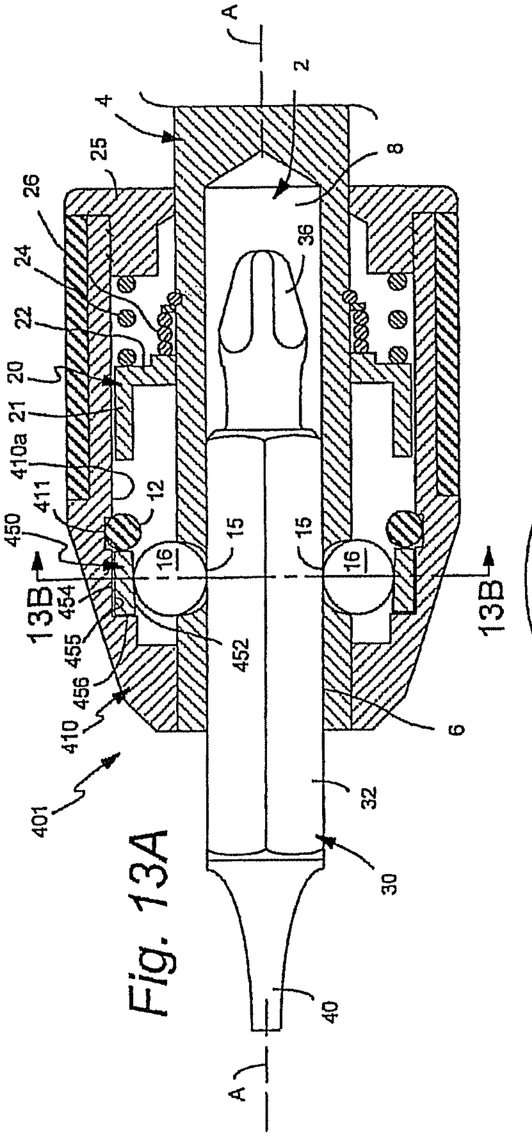
FIG. 13A shows a longitudinal sectional view of another embodiment of a tool-bit holder, with a double-ended tool-bit inserted therein (the tool-bit and distal detent balls of the tool-bit holder are not shown in section).
Figure 13B:
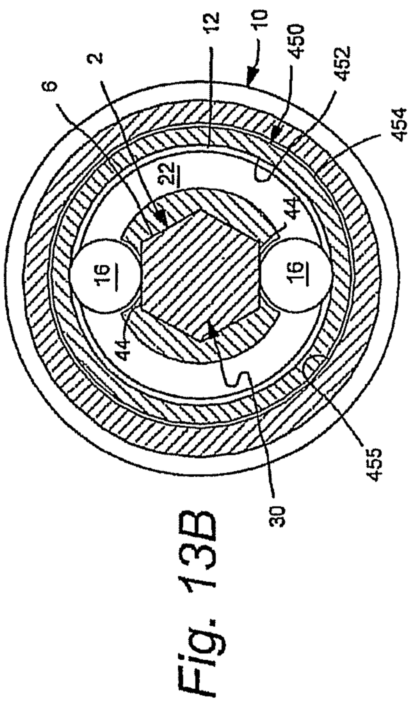
FIG. 13B is a lateral sectional view, as taken along lines 13B-13B in FIG. 13A (the distal detent balls are not shown in section).

Another embodiment of a tool-bit holder 401 is illustrated in FIGS. 13A and 13B. The tool-bit holder 401 is similar in form and function to the tool-bit holder 1 illustrated in FIGS. 1A-7, except for the shape of an inner surface 410*a* of a sleeve 410 and the inclusion of a locking ring 450 within the sleeve 410. The locking ring 450 takes the place of the ramp 14 (see, e.g., FIG. 1A) and itself has an inner circumferential ramp surface 452 thereon. The inner circumferential ramp surface 452 is angled relative to an axis A of the bore 2 of the hub 4, and in one embodiment, an angle from 5-6° is used. An outer circumferential surface 454 of the locking ring 450 is rotatably received by an opposed inner circumferential surface 455 of the inner surface 410*a* of the sleeve 410. The locking ring 450 is retained from axial movement with respect to the sleeve 410 between a distal radial shoulder 456 on the sleeve 410 and the O-ring 12 that is received within the circumferential groove 11 on the inner face 410*a*. Other than the addition of the locking ring feature, the form and function of the tool-bit holder 401 is the same as the tool-bit holder 1 illustrated in FIGS. 1A-7.

The tool-bit holder 401 allows the sleeve 410 to rotate about the hub 4 of the tool-bit holder 401 when the tool-bit 30 is inserted therein and clamped in place by the distal detent balls 16. The distal detent balls 16 are urged inwardly in a progressive manner because of the ramp surface 452 on the locking ring 450. This feature allows an operator to grasp the sleeve 410 while the tool-bit holder 401 is rotating in order to guide or stabilize the tool-bit 30 during its use. FIG. 13B illustrates the relative position of each distal detent ball 416 between one of the flat faces 44 of the tool-bit 30 and the inner circumferential surface 455 of the locking ring 450. In use, the tool-bit holder 401 works like the tool-bit holder 1 of the FIGS. 1A-7, except that the ramp surface 452 of the locking ring 450 engages the distal detent balls 16 rather than the ramp 14 of the sleeve 10, thereby allowing the sleeve 410 to rotate about the locking ring 450 and the hub 4 when the tool-bit 30 is inserted therein.

FIGS. 14A-15B illustrate another embodiment of a tool-bit holder 501 that allows rotation of a sleeve 510 relative to a hub 504 while a tool-bit 30 is grasped by the tool-bit holder 501. As noted above, in each of the illustrated exemplary embodiments there may be one or more distal detent balls or one or more proximal balls in the tool-bit holder. In the illustrated embodiment of FIGS. 14A-15B, there are three distal detent balls (see FIG. 14B) and three proximal balls (see FIG. 15B), with each respective set of distal and proximal balls being equally spaced apart about the axis A (e.g., the balls of each set are spaced apart at 120° intervals). In this embodiment, both the distal detent balls 516 and the proximal balls 518 engage corner edges of the polygon-shaped shank 32 (e.g., hex-shaped shank) of the tool-bit 30.

Figure 14A:
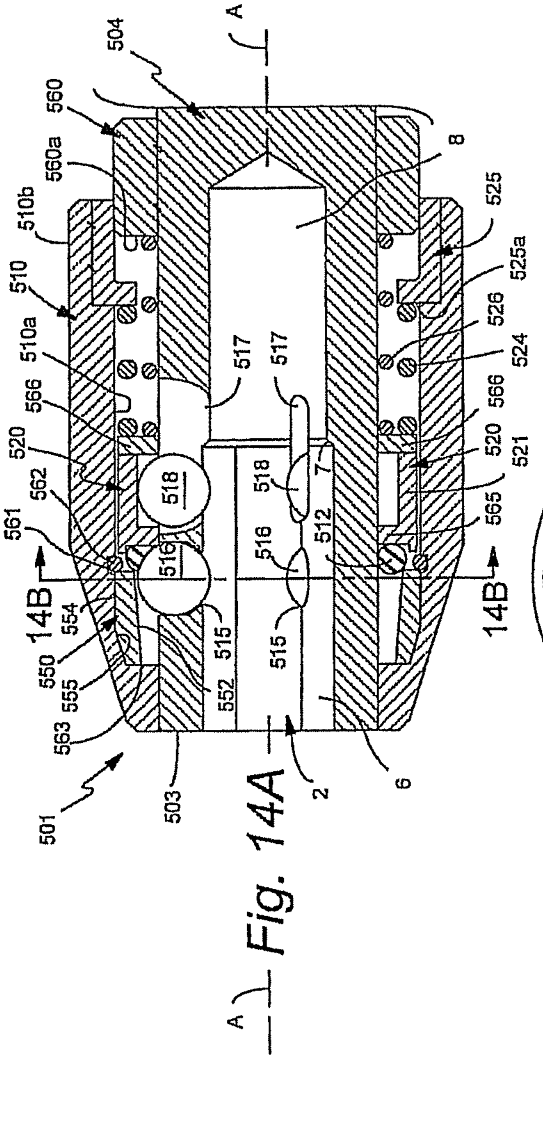
FIG. 14A shows a longitudinal sectional view of an alternative embodiment of a tool-bit holder, illustrating the relative positions of one or more distal detent balls, one or more proximal balls and a spring loaded inner ring and spring loaded sleeve, when no tool-bit is inserted into the tool-bit holder (the distal detent ball and the proximal ball are not shown in section).
Figure 14B:
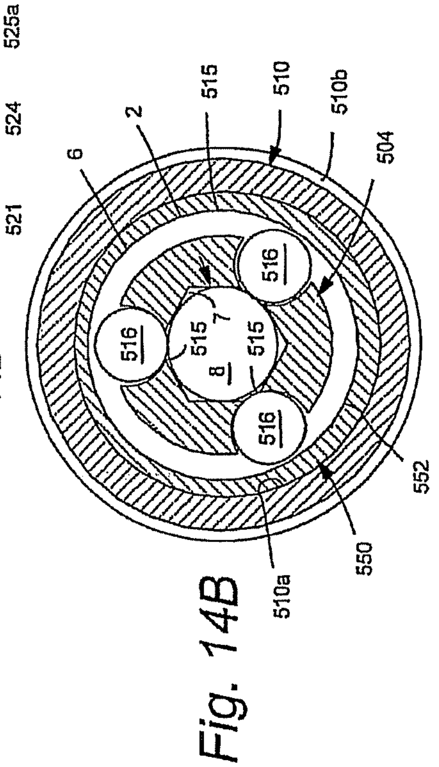
FIG. 14B is a lateral sectional view, as taken along lines 14B-14B in FIG. 14A, illustrating positions of the distal detent balls (not shown in section) when no tool-bit is inserted into the tool-bit holder.
Figure 15A:
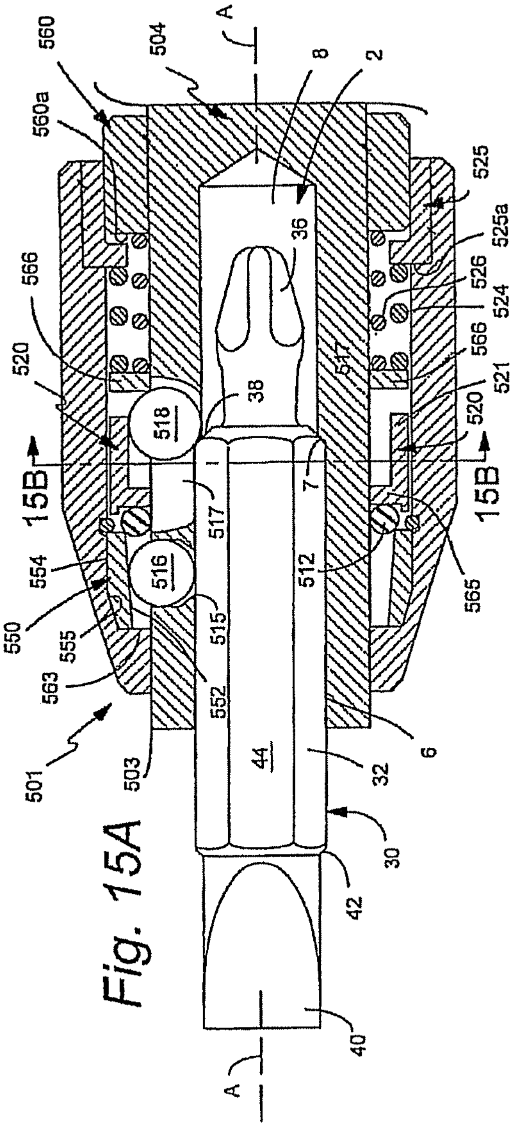
FIG. 15A shows a longitudinal sectional view of the tool-bit holder of FIG. 14A with a double-ended tool-bit inserted therein. A first elongated end of the tool-bit is inserted into the bore of the tool-bit holder (the tool-bit, the distal detent ball and the proximal ball are not shown in section). The tool-bit has a hex-shaped shank that mates with a hex-shaped distal portion of the bore in the tool-bit holder. A proximal end of the tool-bit's hex-shaped shank abuts shoulder portions at a proximal end of the distal portion of the bore, thereby fixing the depth of insertion of the tool-bit into the tool-bit holder. A proximal portion of the bore is a circular bore, which is sized to at least accommodate the first elongated end of the tool-bit therein.
Figure 15B:
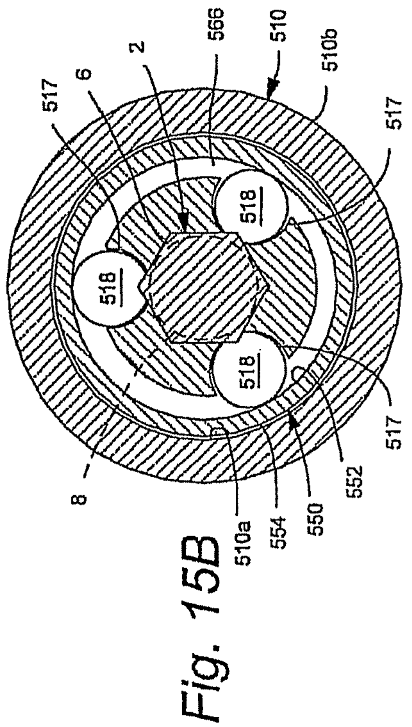
FIG. 15B is a lateral sectional view, as taken along lines 15B-15B in FIG. 15A, illustrating positions of the proximal balls (not shown in section) with the double-ended tool-bit inserted into the tool-bit holder.

The hub 504 has a bore structure as described above, with the bore 2 having a distal polygon-shaped portion 6 (e.g., hex-shaped) and a proximal circular-shaped portion 8, with a radially inwardly extending shoulder 7 therebetween. For each distal detent ball 516, a hole 515 is provided in the bore in communication with the distal portion 6, as illustrated in FIGS. 14A and 14B. Likewise, for each proximal ball 518, a longitudinal slot 517 is provided in the bore. Each slot 517 is aligned to span the shoulder 7 between the distal portion 6 and the proximal portion 8 of the bore 2, as seen in FIGS. 14A and 15A. Each hole 515 and slot 517 is sized to allow partial projection of its respective ball 516 and 518 into the bore 2, but prevent that ball from completely entering the bore 2.

The hub 504 is disposed within a sleeve 510 which is longitudinally moveable along (e.g., over) the hub 504. The sleeve 510 has a longitudinal opening therethrough for receiving the hub 504 therein, and may be rotatable relative to the hub 504. In one embodiment, a distal end of the sleeve 510 slidably mates with the hub 504 adjacent a distal end 503 of the tool-bit holder 501, and the sleeve 510 has a proximal cap 525 affixed to a proximal end of the sleeve 510. Adjacent the proximal cap 525, a hub ring 560 is affixed about and to the hub 504. The proximal cap 525 slidably mates with the hub ring 560. An inner face **510*a* of the sleeve 510 has an inner circumferential groove 561 adapted to receive an outwardly biased clip 562 therein. The clip 562 provides a proximal limit for a locking ring 550 that extends distally therefrom along the inner face 510*a* of the sleeve 510. A distal end of the locking ring 550 abuts a radial surface 563 on the inner face 510*a*. The locking ring 550 has an outer circumferential surface 554 that is rotatably received by an opposed inner circumferential surface 555 of the inner surface 510*a* of the sleeve 510**.

The locking ring 550 has a circumferential ramp surface 552 thereon which is disposed for engagement with each of the balls 516 when the sleeve 510 is moved proximally relative to the hub 504. In one embodiment, the ramp 562 is aligned at an angle of 5.5° with respect to the axis A of the tool-bit holder 501, thus progressive proximal movement of the sleeve 510 pushes each ball 516 further inwardly toward the bore 2. In this instance, as apparent from FIG. 14B, each ball 516 engages an edge of the shank of the tool-bit, as opposed to a flat side thereof.

An inner ring 520 is disposed between the hub 504 and the sleeve 510, adjacent the one or more slots 517 and their respective balls 518. The inner ring 520 has a circumferential outer wall 521 that extends radially outside each ball 518 to retain the ball 518 within its respective slot 517. Thus, while each ball 518 can move longitudinally within its slot 517, its radial position relative to the axis A of the bore 2 is fixed. In one embodiment, each ball 518 extends into the bare 2 only to an extent sufficient to be engaged by a proximal radially outwardly extending edge of a tool-bit that may be inserted into the bore 2, as explained below. The inner ring 520 also has, connected to the outer wall 521, a radially extending distal wall 565 that abuts an O-ring 512 that is disposed distally therefrom within the sleeve 510. A radial washer 566 is slidably disposed over an exterior surface of the hub 504, proximally of the inner ring 520 (and proximally of each proximal ball 518).

An outer biasing element or sleeve spring 524 (such as, e.g., a helical spring) extends in compression between the radial washer 566 and a proximal spring abutment face **525*a* on the proximal cap 525 of the sleeve 510. The sleeve spring 524 urges the radial washer 566 distally relative to the sleeve 510 to retain the O-ring 512 in a desired position relative to each distal detent ball 516. An inner biasing element or inner ring spring 526 (such as, e.g., a helical spring) extends in compression between the radial washer 566 and a proximal spring abutment surface 560*a* of the hub ring 560. In one embodiment, the inner ring spring 526 has a smaller diameter than the sleeve spring 524, and is disposed coaxially within the sleeve spring 524**.

FIG. 14A illustrates the tool-bit holder 501 in an open and unclamped position. The springs 524 and 526 urge the radial washer 566 distally, which in turn urges the inner ring 520 distally and against the O-ring 512, which in turn urges each of the distal detent balls 516 radially inwardly through their respective hole 515. However, the distal detent balls 516 are urged inwardly in a resilient manner, so that if a tool-bit is inserted into the bore 2, the distal detent balls 516 can be pushed radially outwardly by the tool-bit to permit such insertion.

When a tool-bit 30 is inserted into the bore 2 (see FIG. 15A), a proximal edge 38 of the tool-bit 30 passes by each distal ball 516 (pushing it radially outwardly against the force of the O-ring 512) and then engages each proximal ball 518. Further proximal insertion of the tool-bit 30 forces each proximal ball 518 proximally (compare the positions of the proximal balls 518 in FIGS. 14A and 15A). Advancement of the tool-bit 30 into the bore 2 stops when its proximal edge 38 engages the shoulder 7 (see FIG. 15A).

As each proximal ball 518 is moved proximally, it engages the radial washer 566 and moves it likewise proximally relative to the hub 504. This relieves the distal urging force on the inner ring 520 from the inner ring spring 526 and allows proximal movement of the inner ring 520 caused by the biasing force of the O-ring 512. Once that biasing force has been relieved, the inner ring 520 may not move further proximally, and the inner ring 520 separates from the radial washer 566 (which continues proximal movement with the ball 518). The circumferential outer wall 521 of the inner ring 520 has a sufficient longitudinal extent that no matter where the proximal ball 518 moves relative to the inner ring 520, the outer wall 521 abuts an outer side of the proximal ball 518. The proximal movement of the radial washer 566 causes the sleeve spring 524 and the inner ring spring 526 to both be placed further in compression. This compression of the sleeve spring 524 causes proximal movement of the sleeve 510 relative to the hub 504, thereby bringing the ramp surface 552 on the locking ring 550 into engagement with each of the distal detent balls 516. Each ball 516 is thus urged radially inwardly and grasps the shank 32 of the tool-bit 30 along one of the longitudinal edges thereof, locking the tool-bit 30 within the tool-bit holder 501.

In order to remove the tool-bit 30 from the tool-bit holder 501, the sleeve 510 is moved distally by an operator to relieve the radially inward pressure exerted on the distal detent balls 516 by the ramp surface 552. In one embodiment, as long as the proximal edge 38 of the shank 32 of the tool-bit 30 is still proximal of the distal detent balls 516, a biasing pressure from the O-ring 512 causes each of the distal detent balls 516 to be urged resiliently inwardly against the tool-bit 30, thereby preventing it from dropping out of the tool-bit holder 501. This is because the O-ring 512 is again urged against each of the distal detent balls 516 via coupling of the inner ring 520, the radial washer 566 and the inner ring spring 526.

When the tool-bit 30 has been inserted into the tool-bit holder 501, the locking ring 550 allows an operator to grasp the sleeve 510 while the hub 504 is rotating on its axis A. For instance, an operator may choose to grasp the sleeve 510 while the tool-bit holder 501 is rotating in order to guide or stabilize the tool-bit 30 during its use. The surface 554 of the locking ring 550 and the surface 555 of the sleeve 510 are rotatable relative to one another to allow the sleeve 510 to rotate freely about the locking ring 550. In use, the tool-bit holder 501 works like the tool-bit holder 1 of FIGS. 1A-7, except that the ramp surface 552 of the locking ring 550 engages the distal detent balls 516 rather than the ramp 14 of the sleeve 10, thereby allowing the sleeve 510 to rotate about the locking ring 550 and the hub 504 when the tool-bit 30 is inserted therein.

FIGS. 16A-17D illustrate another embodiment of a tool-bit holder 601. This embodiment is similar to the embodiment illustrated in FIGS. 14A-15B, but has a alternate configuration for its inner ring and radial washer assembly, and for its proximal spring abutment surfaces. This embodiment also includes a locking ring 650 which functions like the locking rings discussed above (e.g., locking rings 450 and 550) in that an operator can grasp a sleeve 610 of the tool-bit holder 601 relative to a rotating hub 504 and the tool-bit 30 therein. In one embodiment, a ramp 652 on the locking ring 650 is inclined at an angle of 6° relative to an axis A of the tool-bit holder 601.

In this embodiment, an inner ring 620 is disposed between the hub 504 and the sleeve 610, adjacent the one or more slots 517 of the hub 504 and their respective proximal balls 518. The inner ring 620 has a circumferential outer wall 621 that extends radially outside each proximal ball 518 to retain the proximal ball 518 within its respective slot 517 (at all relative positions of the inner ring 620 with respect to each proximal ball 618). The inner ring 620 also has, connected to the outer wall 621, a radially extending proximal wall 622 that abuts a proximal side of each proximal ball 518. A radial washer 666 is disposed about the hub 504 between the distal detent balls 516 and the proximal balls 518.

An outer biasing element or sleeve spring 624 (such as, e.g., a helical spring) extends in compression between the proximal wall 622 of the inner ring 620 and a proximal spring abutment surface 625*a* on a washer 668 that is fixed to an inner surface 610*a* of the sleeve spring 610 by a proximal cap 625 that itself is fixed to the sleeve 610. An inner biasing element or inner ring spring 626 (such as, e.g., a helical spring) extends in compression between the proximal wall 622 of the inner ring 620 and a proximal spring abutment surface 660*a* of a hub ring 660. The hub ring 660 is fixed to the hub 504. The proximal cap 625 of the sleeve 610 and the hub ring 660 are longitudinally slidable relative to one another. In one embodiment, the inner ring spring 626 has a smaller diameter than the sleeve spring 624, and is coaxially disposed within the sleeve spring 624.

Figure 16A:
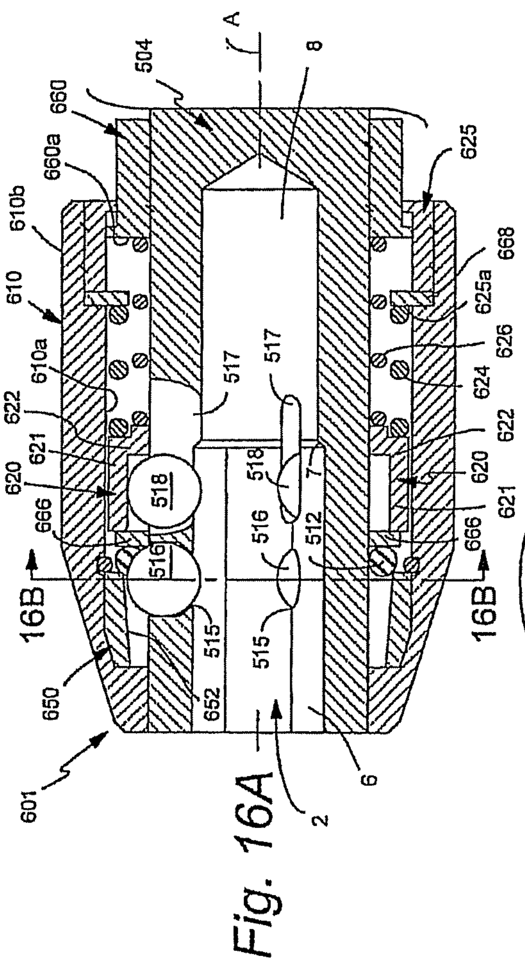
FIG. 16A shows a longitudinal sectional view of an alternative embodiment of a tool-bit holder, and illustrates the relative positions of one or more distal detent balls, one or more proximal balls, a spring loaded inner ring and a spring loaded sleeve, when no tool-bit is inserted into the tool-bit holder.
Figure 16B:
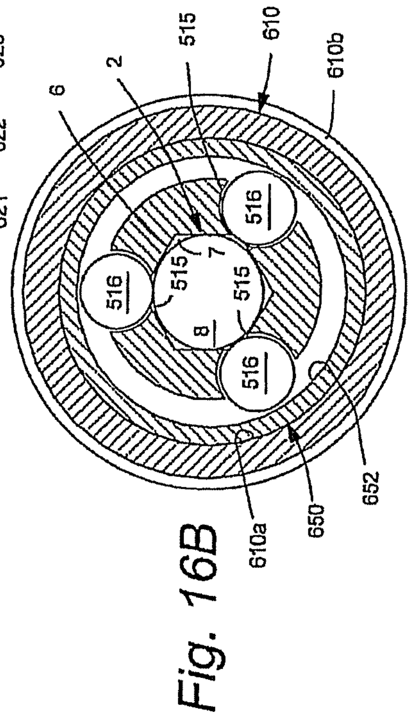
FIG. 16B is a lateral sectional view, as taken along lines 16B-16B in FIG. 16A, illustrating positions of the distal detent balls (not shown in section) when no tool-bit is inserted into the tool-bit holder.
Figure 17A:
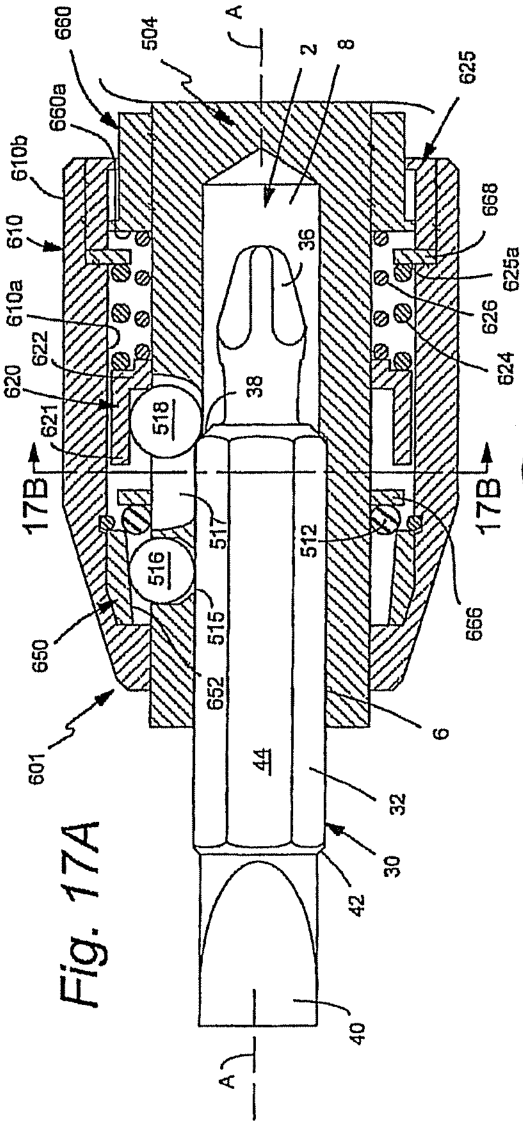
FIG. 17A shows a longitudinal sectional view of the tool-bit holder of FIG. 16A with a double-ended tool-bit inserted therein. A first elongated end of the tool-bit is inserted into the bore of the tool-bit holder (the tool-bit, the distal detent ball and the proximal ball are not shown in section). The tool-bit has a hex-shaped shank that mates with a hex-shaped distal portion of the bore in the tool-bit holder. A proximal end of the tool-bit's hex-shaped shank abuts shoulder portions at a proximal end of the distal portion of the bore, thereby fixing the depth of insertion of the tool-bit into the tool-bit holder. A proximal portion of the bore is a circular bore, which is sized to at least accommodate the first elongated end of the tool-bit therein.
Figure 17B:
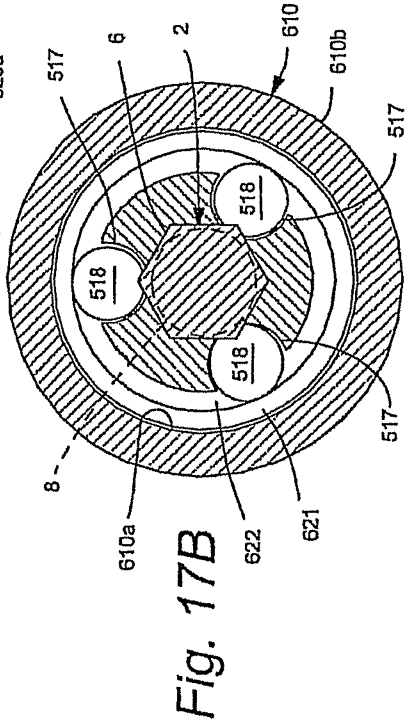
FIG. 17B is a lateral sectional view, as taken along lines 17B-17B in FIG. 17A, illustrating positions of the proximal balls (not shown in section) with the double-ended tool-bit inserted into the tool-bit holder.

FIG. 16A illustrates the tool-bit holder 601 in its opened and unclamped position. Each distal detent ball 516 is resiliently urged into the distal portion 6 of the bore 2 by the O-ring 512, which is urged against the distal detent ball 516 via the biasing force from the inner ring spring 626 acting on the O-ring 512 through the inner ring 620 and the radial washer 666. On insertion of the tool-bit 30 into the bore 2, the distal detent balls 616 are pushed radially outwardly against the bias of the O-ring 512 to permit such insertion. The proximal edge 38 of the tool-bit 30 ultimately engages each of the proximal balls 518 and moves them proximally, which in turn moves the inner ring 620 proximally against the bias of the inner ring spring 626. Such inner ring 620 movement thus places the sleeve spring 624 in further compression and causes proximal movement of the sleeve 610 relative to the hub 504, thereby bringing the ramp surface 652 into engagement with each of the distal detent balls 516 and forces them radially inwardly against the tool-bit 30 to grasp it. In use, the tool-bit holder 601 works like the tool-bit holder 1 of FIGS. 1A-7, except that the ramp surface 652 of the locking ring 650 engages the distal detent balls 516 rather than the ramp 14 of the sleeve 10, thereby allowing the sleeve 610 to rotate about the locking ring 650 and the hub 504 when the tool-bit 30 is inserted therein.

Figures 20, 21:
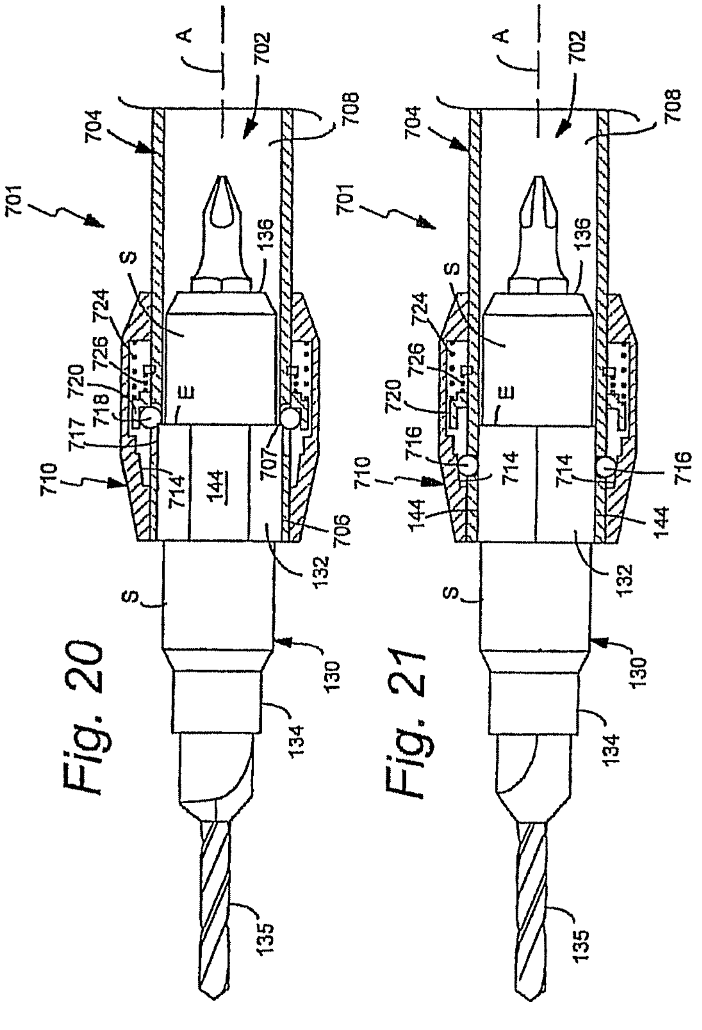
FIG. 20 shows a longitudinal sectional view of the tool-bit holder of FIG. 19 with the combination drilling and driving tool-bit inserted therein (the combination drilling and driving tool-bit and the proximal balls are not shown in section).
FIG. 21 shows a longitudinal sectional view of the tool-bit holder of FIG. 20 with the combination drilling and driving tool-bit inserted therein, with the assembly rotated 90° on its longitudinal axis (back to the viewing orientation of FIG. 18, wherein the one or more distal detent balls are visible). In this view, the combination drilling and driving tool-bit and the distal detent balls are not shown in section.

FIGS. 18-21 illustrate an alternative embodiment of a tool-bit holder 701, for use with a combination drilling and driving tool-bit 130. The drilling and driving tool-bit 130 has a polygon-shaped central shank 132. Extending from one end of the shank 132 is a tool assembly 134 (see FIGS. 20 and 21, where the illustrated tool assembly 134 includes a drill bit 135). Extending from the other end of the shank 132 is a tool assembly 136 (including, for example, a Phillips head screwdriver tip). Each tool portion 134 and 136 includes a generally cylindrical section S proximate the shank 132. An edge E is formed where the shank 132 meets each such cylindrical section S. The edge E has radially outwardly extending portions thereof, which comprise end faces adjacent the adjoining corners of the flat faces of the shank 132. The combination drilling and driving tool-bit 130 may be inserted into the tool-bit holder 701 with either tool assembly 134 or 136 thereof extending outwardly for use. In the illustration of FIGS. 20 and 21, the drill bit assembly 134 is shown outwardly for use for drilling a hole in a workpiece with the drill bit 135.

In this embodiment, the tool-bit holder 701 has a cylindrical hub 704 that, at some proximal point (not shown) is connected to a handle or rotational motor. The hub 704 has a longitudinal bore 702 therein that has a distal polygon-shaped portion 706 and a proximal circular-shaped portion 708, with a radially inwardly extending shoulder 707 therebetween. The distal polygon-shaped portion 706 is configured to mate with the shank 132 of the combination drilling and driving tool-bit 130 so that rotation of the hub 704 causes rotation of the tool-bit 130 when the tool-bit 130 is inserted within the bore 702 of the hub 704. The proximal portion 708 is deep enough to accommodate elongated tool assemblies such as one including the drill bit 135.

Figures 18, 19:
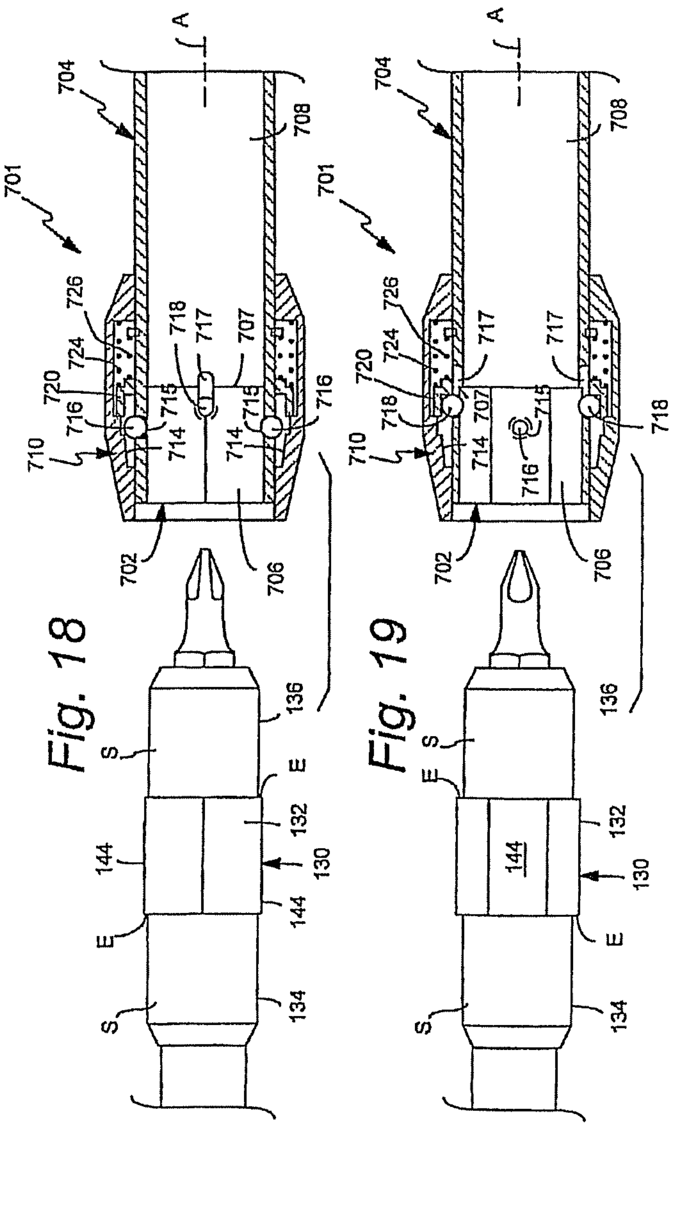
FIG. 18 shows a longitudinal sectional view of another embodiment of a tool-bit holder, with a combination drilling and driving tool-bit poised to be inserted into the tool-bit holder via a bore opening at a distal end of the tool-bit holder (the distal detent balls of the tool-bit holder and the combination drilling and driving tool-bit are not shown in section).
FIG. 19 shows a longitudinal sectional view of the tool-bit holder of FIG. 18 and its corresponding combination drilling and driving tool-bit, with both components rotated 90° on their respective longitudinal axes (the proximal balls and the combination drilling and driving tool-bit are not shown in section).

A sleeve 710 is longitudinally moveable along (e.g., over) the bore 704. In an open unclamped state (as illustrated in FIGS. 18 and 19), a distal end of the sleeve 710 extends beyond a distal end of the bore 704. The sleeve 710 has an inner face which includes a distal circumferential ramp 714 thereon. As discussed above, the ramp 714 is inclined relative to the axis A of the bore 702, having a diameter that gets smaller as the ramp 714 extends distally along the sleeve 710.

The bore 704 has one or more holes 715 therethrough, each of which are sized to allow partial projection of a respective distal detent ball 716 therein into the bore 702. In the illustrated embodiment, two distal detent balls 716 are seen, although fewer or more distal detent balls 716 may be provided, as desired. Each distal detent ball 716 is aligned to engage one of the flat faces 144 on the shank 132 of the tool-bit 130.

FIG. 19 is the same view as FIG. 18 except that both the tool-bit holder 701 and the tool-bit 130 have been rotated 90° on their axes A. As seen in both FIGS. 18 and 19, the bore 704 also has one or more longitudinal slots 717 extending therethrough, with each slot 717 formed to retain a proximal ball 718 therein and sized to allow partial projection of that proximal ball 718 into the bore 702. Each slot 717 spans the shoulder 707 between the distal portion 706 and proximal portion 708 of the bore 702. As seen in FIG. 19, each proximal ball 718 is urged toward a distal end of its respective slot 717 by an inner ring 720 engaging the proximal ball 718, with the inner ring 720 in turn biased distally by an inner ring spring 726 extending in compression between a surface fixed relative to the bore 704 and the inner ring 720. A sleeve spring 724 extends concentrically about the inner ring spring 726 and is in compression between the inner ring 720 and a proximal abutment surface on or fixed relative to the sleeve 710. The inner ring 720 has a cylindrical outer wall which abuts each proximal ball 718 and limits its radial outward movement relative to the hub 704, thereby maintaining a portion of that proximal ball 718 within the bore 704 at all times, via its respective slot 717.

FIG. 20 is the same view as FIG. 19, but illustrates the relative change in condition of the proximal balls 718, inner ring 720, springs 724 and 726, and sleeve 710 with respect to the bore 704 when the tool-bit 130 is fully inserted into the bore 702. An edge E of the shank 132 of the tool-bit 130 engages each proximal ball 718 as the tool-bit 130 is inserted into the bore 702 and moves it proximally within its respective slot 717. Proximal movement of the edge E is limited when it engages the shoulder 707 at the distal end of the proximal portion 708 of the bore 702 (as seen in FIG. 20). Proximal movement of the inner ring 720 caused by insertion of the tool-bit 132 further compresses the sleeve spring 724, causing the sleeve 710 to move proximally relative to the bore 704. As seen in FIG. 21, such proximal movement of the sleeve 710 causes the ramp 714 to engage each distal detent ball 716 and urge it radially inwardly against one of the flat faces 144 of the shank 132 of the tool-bit 130. The tool-bit 130 is thus effectively grasped and cannot be removed from the tool-bit holder 701 until the radial inward holding pressure on each distal detent ball 716 is released. That pressure is released by an operator manually pushing the sleeve 710 distally relative to the hub 704 to an extent that each distal detent ball 716 releases its grasping force against one of the flat faces 144 of the shank 132. The tool-bit 130 can then be removed from the tool-bit holder 701 and reversed for use, or replaced with another tool-bit.

While the embodiment of FIGS. 18-21 differs in configuration from the previously illustrated exemplary embodiments, its functionality is the smile. The insertion of a tool-bit into the tool-bit holder engages a moveable member (e.g., the proximal ball) extending radially into a bore for the tool-bit, and causes proximal movement of the moveable member, which in turn causes proximal movement of a sleeve about the bore, bringing a ramped or camming surface into engagement with a distal detent ball. The distal detent ball engages the tool-bit and locks it in place relative to the tool-bit holder. The tool-bit is only released when an operator moves the sleeve distally relative to the hub of the tool-bit holder. Except for the tool-bit holder embodiment illustrated in FIGS. 24 and 25, these features are common to all of the embodiments disclosed herein.

With respect to the tool-bit holder 701 illustrated in FIGS. 18-21, in one embodiment the sleeve 710 is rotatable relative to the hub 704 and thus an operator can grasp the sleeve 710 while the hub 704 and tool-bit 130 therein is rotating. In addition, although two distal detent balls 716 and two proximal balls 718, fewer or more balls may be used in each such set in the configuration of this embodiment of the tool-bit holder of the present disclosure.

FIGS. 22A-23B illustrate another embodiment of a tool-bit holder 801. In this embodiment, like the embodiment of FIGS. 18-21, the tool-bit holder 801 may be formed to accommodate a combination drilling and driving tool-bit 130. In this embodiment, the radial force to clamp the tool-bit 130 within the tool-bit holder 801 is created by an inner shoulder 814 within a sleeve 810 working over one or more distal detent balls 816 in contact with the tool-bit 130.

FIGS. 22A-23B illustrate the tool-bit holder 801 in two states, a state where a tool-bit 130 is being inserted (where the sleeve 810 is in its unclamped or open position relative to a hub 804) and a state where the tool-bit 130 has been inserted and is locked within the tool-bit holder 801 (where the sleeve 810 is in its clamped or tool-bit capture position relative to the hub 804). The sleeve 810 is moveable axially along the hub 804 of the tool-bit holder 801, and is retained in its open and clamped position relative to the hub 804 by a pair of axially spaced detent grooves 870 and 872 on an exterior cylindrical surface of the hub 804. A radially inwardly biased detent element 874 (such as, e.g., an O-ring, wire ring, extension spring, biased ball(s) or the like) is carried in an inner circumferential groove 876 on the sleeve 810. The detent element 874 is alternatively received within the detent grooves 870, 872 to either hold the sleeve 810 in its open position (for tool-bit insertion or removal—see FIG. 22A) or in its clamped position (for tool-bit clamping—see FIG. 23A).

Figures 22A, 22B:
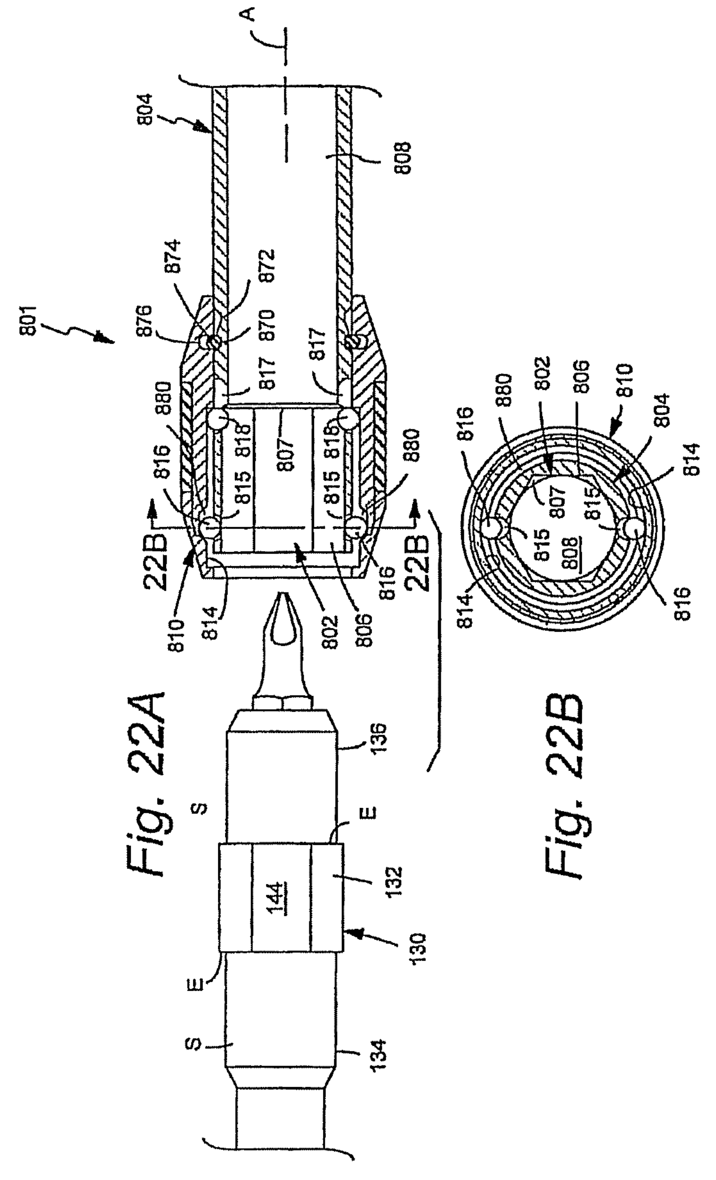
FIG. 22A shows a longitudinal sectional view of another embodiment of a tool-bit holder, with a combination drilling and driving tool-bit poised to be inserted into the tool-bit holder via a bore opening at a distal end of the tool-bit holder (the distal detent balls and the proximal detent balls of the tool-bit holder and the combination drilling and driving tool-bit are not shown in section).
FIG. 22B is a lateral sectional view as taken along lines 22B-22B in FIG. 22A, illustrating positions of the distal detent balls (not shown in section) when no tool-bit is inserted into the tool-bit holder.

In use, the sleeve 810 is initially placed in a distally extended or open position (as seen in FIG. 22A). The sleeve 810 is maintained in this position by a detent element 874 being received within the more distal detent groove 870. A tool-bit 130 is inserted into a distal open end of a longitudinally extending bore 802 of the hub 804 and moved inwardly or proximally (to the right as seen in FIG. 22A).

The bore 802 has a distal polygon-shaped portion 806 and a proximal circular-shaped portion 808, with a radially inwardly extending shoulder 807 therebetween. One or more holes 815 are provided in the hub 804, with each hole 815 sized for retention of a respective distal detent ball 816 therein. In this embodiment, the holes 815 are aligned along edges of flat faces of the polygon-shaped portion 806 of the bore 802 (see FIG. 22B). In this embodiment, portions of an inner surface of the sleeve 810 mate with an exterior surface of the hub 804, and the sleeve 810 inner surface includes a cavity 880 spaced radially from the axis A. When the tool-bit holder 801 is in the open position (FIGS. 22A and 22B), each hole 815 in the bore 802 and the cavity 880 in the sleeve 810 allow each distal detent ball 816 to move completely out of the bore 802, and thus not interfere with insertion or removal of the tool-bit 130. The cavity 880 is retained in this alignment with respect to each hole 815 by engagement of the detent element 874 with the most distal detent groove 870 (as seen in FIG. 22A). Although two distal detent balls 816 are illustrated in FIGS. 22A-23B, in one embodiment three such balls are employed, with adjacent distal detent balls spaced 120° apart about an axis A of the bore 802 of the hub 804. Likewise, although two proximal balls 818 are illustrated in FIGS. 22A-23B, in one embodiment three such balls are employed, with adjacent proximal balls spaced 120° apart about the axis A of the bore 802 of the hub 804.

Figure 23A:
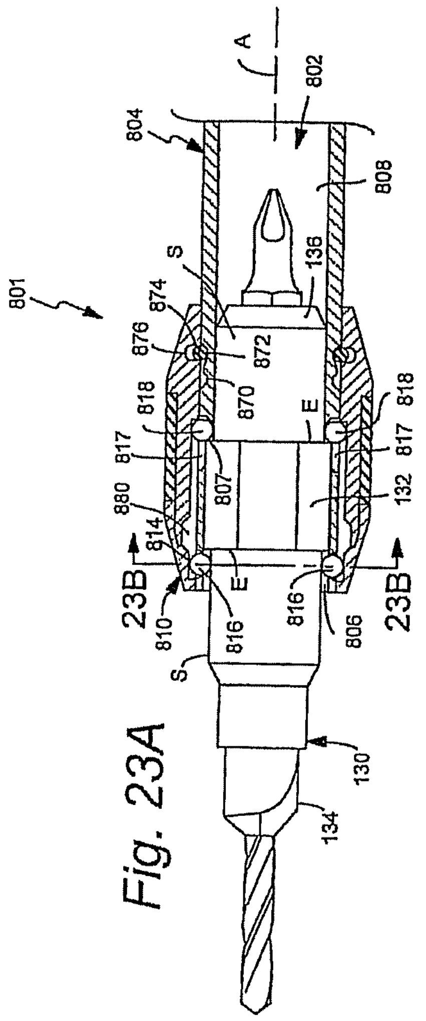
FIG. 23A shows a longitudinal sectional view of the tool-bit holder of FIG. 22A with the combination drilling and driving tool-bit inserted therein (the distal detent balls and the proximal balls of the tool-bit holder and the combination drilling and driving tool-bit are not shown in section).
Figure 23B:
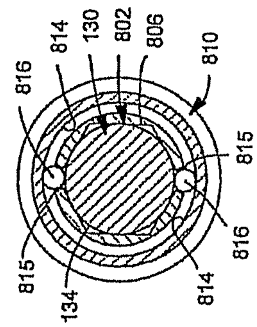
FIG. 23B is a lateral sectional view, as taken along lines 23B-23B in FIG. 23A, illustrating positions of the distal detent balls when the combination drilling and driving tool-bit is inserted into the tool-bit holder (the distal detent balls and the combination drilling and driving tool-bit are not shown in section).

In use, the sleeve 810 is initially in a distally extended or open position (see FIG. 22A). The sleeve 810 is maintained in this position by the detent element 874 being received within the more distal detent groove 870. As the tool-bit 130 is inserted into a distal open end of the bore 802 and moved inward or proximally (to the right as seen in FIG. 22A), the shank 132 of the tool-bit 130 moves proximally past the distal detent balls 816. Proximal travel of the tool-bit 130 continues into the bore 802 of the hub 804 and the proximal end faces of the hex points (i.e., the most proximal edge E) of the shank 132 of the tool-bit 130 contact the one or more proximal balls 818 which are held in their respective slots 817 in the hub 804 by the sleeve 810. As the tool-bit 130 movement proximally is continued, the proximal balls 818 are carried proximally along with the tool-bit 130 and move in their respective slots 817 within the hub 804. Outward radial movement of each proximal ball 818 is prevented by an inner surface of the sleeve 810. Proximal movement of the proximal balls 818 is transferred directly to the sleeve 810 by engagement therebetween, which causes disengagement of the detent element 874 from the most distal detent groove 870 and movement of the detent element 874 toward and into the more proximal detent groove 872. Proximal movement of the sleeve 810 is limited when the detent element 874 is fully seated within the more proximal detent groove 872 (as seen in FIG. 23A). At the same time, each distal detent ball 816 is moved within its cavity in the sleeve 810 to a position engaging the shank 132 of the tool-bit 130 and is forced against the shank 132 by the inner shoulder 814 of the sleeve 810. Each distal detent ball 816 engaging the tool-bit 132 in this matter creates a state of tool-bit clamping, frictionally fixing the tool-bit 130 within the bore 802 of the hub 804, as seen in FIG. 23A. In one embodiment, withdrawal of the tool-bit 130 is inhibited not only by engagement, but by interference of the distal detent balls 816 with the most distal edge E on the shank 132 of the tool-bit 130.

Figure 24:
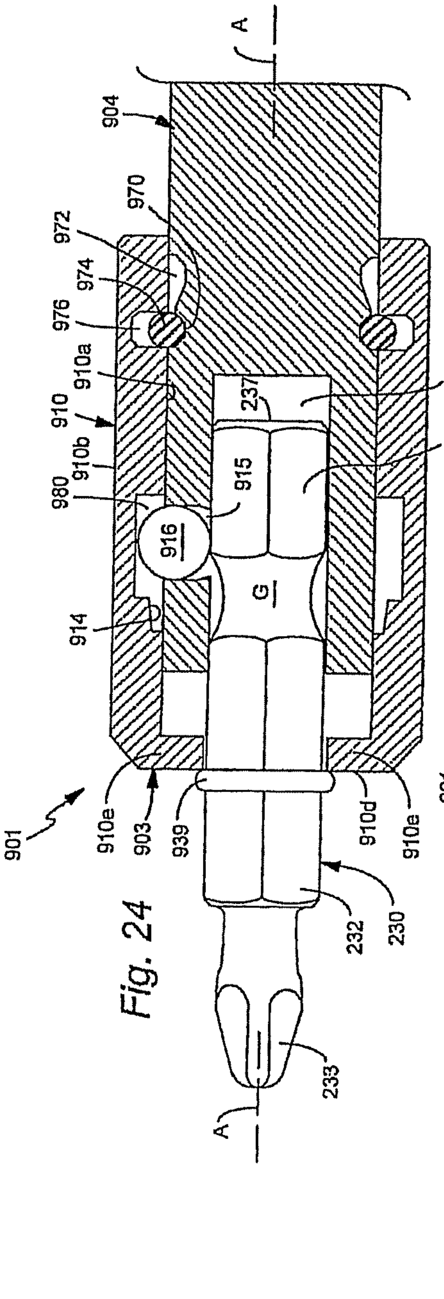
FIG. 24 shows a longitudinal sectional view of an alternative embodiment of a tool-bit holder showing partial insertion of a single-ended tool-bit into a bore in a hub of the tool-bit holder (the distal detent balls and tool-bit are not shown in section).
Figure 25:
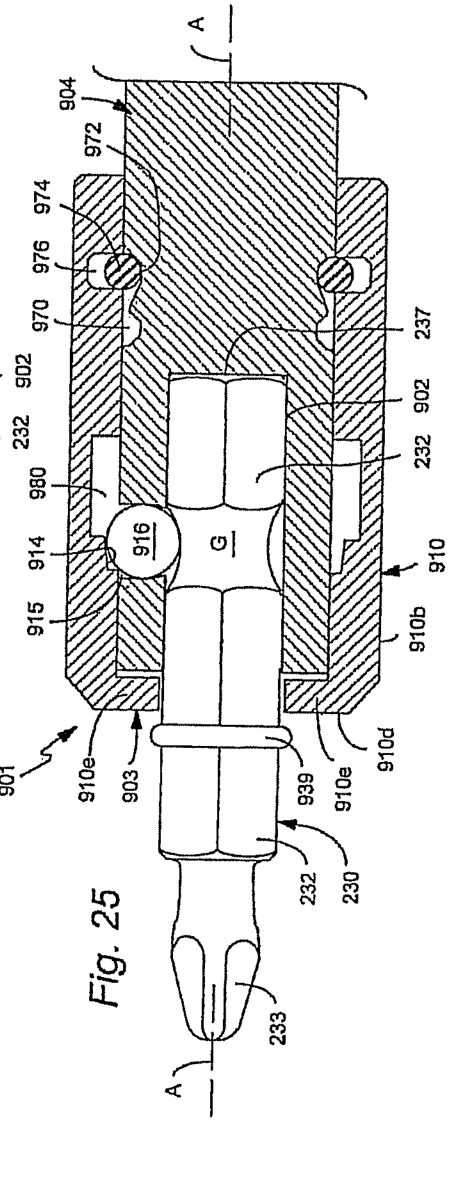
FIG. 25 is a longitudinal sectional view of the tool-bit holder of FIG. 24, showing the tool-bit fully inserted within the bore of the tool-bit holder (the distal detent balls and the tool-bit are not shown in section).

During tool-bit extraction, the sleeve 810 is manually pulled outward or distally (to the left as seen in FIG. 23A). This forces the detent element 874 to ride out of the more proximal detent groove 872 on the hub 804 and provides relief for each distal detent ball 816 to move radially outwardly away from the tool-bit 130 into its respective cavity 880 in the sleeve 810. The tool-bit 130 is urged distally out of the bore 802 of the hub 804 by contact of the proximal balls 818 with the faces of the hex points of the shank 132 of the tool-bit 130 (with the most proximal edge E of the tool-bit 130), where the proximal balls 818 are moved because of the operator-caused movement of the sleeve 810 in a distal direction. This tool-bit ejection movement continues until the detent element 874 reaches the most distal detent groove 870 and becomes seated therein (again, such as illustrated in FIG. 22A). The tool-bit 130 has thus been released and an operator can grasp it for removal from the bore 802 of the hub 804. The sleeve 810 remains in the distally extended or open position, thus making the tool-bit holder 801 ready for insertion of the next tool-bit FIGS. 24 and 25 illustrate another embodiment of a tool-bit holder 901. In this embodiment, a polygon-shaped bore 902 is provided in a hub 904, with a bore 902 open adjacent a distal end 903 of the tool-bit holder 901. A sleeve 910 extends slidably longitudinally over the bore 904. Portions of an inner surface 910*a* of the sleeve 910 mate with an exterior cylindrical surface of the bore 902. The inner surface 910*a* has a cavity 980 spaced radially from a longitudinal axis A of the bore 902, wherein the cavity 980 includes a circumferential ramp 914 therein adjacent a distal end of the cavity 980. An outer surface 910*b* of the sleeve 910 is generally cylindrical. The sleeve 910 has a distal end 910*d* that has one or more projections 910*e* extending radially inwardly therefrom. In one embodiment, the projection 910*e* is defined as a proximal distal end wall of the sleeve 910.

One or more holes 915 are provided in the hub 904, with each hole 915 being in communication with the bore 902 and extending radially outwardly therefrom. Each hole 915 is sized to receive a distal detent ball 916 therein, and to allow a portion of the distal detent ball 916 to selectively project into the bore 902, but prevent the entire ball 916 from entering the bore 902.

In this embodiment, the sleeve 910 is moveable between an unclamped or open position relative to the hub 804 (FIG. 24) and a clamped or tool-bit capture position relative to the hub 804 (FIG. 5) in the same general manner as the embodiment illustrated in FIGS. 22A-23B. To that end, the sleeve 910 is moveable axially along the hub 904, and is retained in its opened and clamped position relative to the hub 904 by a pair of axially spaced detent grooves 970 and 972 on the exterior cylindrical surface of the hub 904. A radially inwardly biased detent element 974 (such as, e.g., an O-ring, wire ring, extension spring, biased ball(s) or the like) is carried in an inner circumferential groove 976 on the sleeve 910. The detent element 974 is alternately received within the detent grooves 870, 872 to either hold the sleeve 910 in its open position (for tool-bit insertion or removal—see FIG. 24) or in its clamped position (for tool-bit clamping—see FIG. 25).

FIGS. 24 and 25 illustrate a tool-bit 230 configured for use with respect to the tool-bit holder 901. The tool-bit 230 (illustrated as a single-ended tool-bit, although a double-ended tool-bit will work as long as the depth of the bore 902 is sufficient to accept each end of the double-ended tool-bit therein). The tool-bit 230 has a tool end 233 and a generally flat end 237. The tool-bit 230 has a polygon-shaped shank portion 232, and in the illustrated embodiment, has a power groove G formed thereon. The tool-bit 230 has a radially outwardly extending projection 239 that is sized to engage the one or more projections 910*e* of the sleeve 910 when the tool-bit 230 is moved proximally into the hub 904. FIG. 24 illustrates the projection 939 of the tool-bit 230 at the point where it first engages the projection 910*e* of the sleeve 910 upon insertion into the bore 902. In one embodiment, the projection 939 may extend entirely about the shank 232 of the tool-bit 230.

As seen in FIG. 24, when the tool-bit holder 901 is in the open position, each hole 915 in the bore 902 and the cavity 980 in the sleeve 910 allow the ball 916 to move completely out of the bore 902, and thus not interfere with insertion or removal of the tool-bit 230. The cavity 980 is retained in this alignment with respect to each hole 915 by engagement of the detent element 974 with the most distal detent groove 970 (as seen in FIG. 24).

As the tool-bit 230 is further moved proximally into the bore 902 of the hub 904, the radial projection 939 pushes the sleeve 910 proximally relative to the bore 902. This movement in tuna causes the detent element 974 to first expand radially outwardly into the inner circumferential groove 976, and then contract back radially inwardly into the proximal detent groove 972. Once the detent element 974 is in the more proximal detent groove 972, the sleeve 910 is in its locked position relative to the hub 904. As the sleeve 910 moves to this position (see FIG. 25), the circumferential ramp 914 engages each distal detent ball 916 and urges it radially inwardly toward the bore 902 through the hole 915. In the illustrated embodiment, when the tool-bit 230 is fully inserted, a portion of the power groove G of the tool-bit 230 is aligned radially relative to the hole 915 and thus accommodates such radial inward movement of the distal detent ball 916. The sleeve 910 is thus fixed in this position relative to the hub 904 and the tool-bit 230 is locked within the tool-bit holder 901. The mated polygon-shapes of the bore 902 and shank 232 of the tool-bit 230 couple those two components together for rotation about the axis A.

To remove the tool-bit 230 from the tool-bit holder 901, an operator moves the sleeve 910 distally relative to the hub 904, from its clamped position (FIG. 25) back to its undamped position (FIG. 24). The tool-bit 230 can then be distally withdrawn from the bore 902 by further distal engagement of the tool-bit by an operator's hand. The sleeve 910 remains in a distally extended or open position, thus making the tool-bit holder 901 ready for insertion of the next tool-bit.

In all cases, this disclosure presents the invention by way of representation and not limitation. It should be understood that numerous other modifications and embodiments can be devised by those skilled in the art which fall within the scope and spirit of the principles of this invention.

What is claimed is:

1. In a tool-bit holder of the type having a hub, wherein the hub has a longitudinally extending axial bore for receiving a tool-bit therein, a detent ball radially projecting into the bore to selectively engage the tool-bit, and a circumferential ramp that is longitudinally moveable over the detent ball to cause radial movement thereof, wherein the tool-bit holder has a distal end for receiving the tool-bit therein and a proximal end, the improvement which comprises:

a longitudinally moveable member that extends through a slot in the hub and radially into the bore, wherein the circumferential ramp is moveable as a function of longitudinal movement of the moveable member relative to the hub;

an inner ring disposed about the hub in coupled engagement with the moveable member, wherein the inner ring is longitudinally moveable relative to the circumferential ramp;

an inner ring spring biasing the inner ring distally toward the circumferential ramp; and a sleeve spring biasing the circumferential ramp distally relative to the hub.

2. The improvement of claim 1 wherein the moveable member is a ball.

3. The improvement of claim 1 wherein the moveable member is a pin.

4. The improvement of claim 1 wherein the inner ring spring and sleeve spring are concentrically disposed about the hub.

5. The improvement of claim 1 wherein the tool-bit holder has a distal end for receiving the tool-bit therein and a proximal end, and further comprising:

a sleeve spring biasing the circumferential ramp proximally relative to the hub.

6. The improvement of claim 1 wherein the hub has a plurality of the slots therethrough, and wherein a plurality of the moveable members are provided, wherein each moveable member extends radially into the bore through a respective one of the slots.

7. The improvement of claim 1 wherein the tool-bit has a radially outwardly extending edge between portions thereof, and wherein the moveable member extends into the bore only to an extent sufficient to be engaged by the radially extending edge of the tool-bit.

8. The improvement of claim 7 wherein the radially outwardly extending edge comprises one or more end faces of corners of a hex-shaped shank portion of the tool-bit.

9. In a tool-bit holder of the type having a hub, wherein the hub has a longitudinally extending axial bore for receiving a tool-bit therein, a detent ball radially projecting into the bore to selectively engage the tool-bit, and a circumferential ramp that is longitudinally moveable over the detent ball to cause radial movement thereof, wherein the tool-bit holder has a distal end for receiving the tool-bit therein and a proximal end, the improvement which comprises:

a longitudinally moveable member that extends radially into the bore only to an extent sufficient to be engaged by a radially outwardly extending edge between portions of the tool-bit when the tool-bit is inserted in the bore, wherein the circumferential ramp is moveable as a function of longitudinal movement of the moveable member relative to the hub;

an inner ring disposed about the hub in coupled engagement with the moveable member, wherein the inner ring is longitudinally moveable relative to the circumferential ramp;

an inner ring spring biasing the inner ring distally toward the circumferential ramp; and a sleeve spring biasing the circumferential ramp distally relative to the hub.

10. The improvement of claim 9 wherein the moveable member is a ball.

11. The improvement of claim 9 wherein the moveable member is a pin.

12. The improvement of claim 9 wherein the inner ring spring and sleeve spring are concentrically disposed about the hub.

13. The improvement of claim 9 wherein the tool-bit holder has a distal end for receiving the tool-bit therein and a proximal end, and further comprising:

a sleeve spring biasing the circumferential ramp proximally relative to the hub.

14. The improvement of claim 9 wherein a plurality of the moveable members are provided.

15. The improvement of claim 9 wherein the radially outwardly extending edge comprises one or more end faces of corners of a hex-shaped shank portion of the tool-bit.

16. A tool-bit holder comprising:

a hub for receiving a tool-bit within an axial bore thereof;

a sleeve longitudinally moveable along the hub;

an inner ring within the sleeve, wherein the inner ring is longitudinally moveable relative to the sleeve and relative to the hub;

at least one detent disposed between the sleeve and the hub and adapted to radially engage the tool-bit;

a moveable member extending radially into the bore through a longitudinal slot in the hub, wherein proximal movement of the moveable member relative to the hub causes proximal movement of the inner ring;

an inner ring spring biasing apart the inner ring and a spring abutment surface of the hub; and a sleeve spring biasing apart the inner ring and a spring abutment surface of the sleeve wherein, upon insertion of the tool-bit into the bore to engage the moveable member, the inner ring, inner ring spring, sleeve spring and sleeve cooperate to urge the detent against the tool-bit.

17. The tool-bit holder of claim 16 wherein the moveable member extends partially into the bore of the hub.

18. The tool-bit holder of claim 17 wherein the moveable member is a ball.

19. The tool-bit holder of claim 17 wherein the moveable member is a plurality of balls.

20. The tool-bit holder of claim 17 wherein the moveable member is a pin.

21. The tool-bit holder of claim 17 wherein the moveable member is a plurality of pins.

22. The tool-bit holder of claim 16 wherein the moveable member extends completely across the bore of the hub.

23. The tool-bit holder of claim 16, and further comprising:

an annular member disposed on the sleeve, wherein engagement with the annular member urges the detent radially inwardly.

24. The tool-bit holder of claim 16 wherein the sleeve is rotatable about the hub.

* * * * *

UNITED STATES PATENT AND TRADEMARK OFFICE

CERTIFICATE OF CORRECTION

PATENT NO. : 8,636,287 B2
APPLICATION NO. : 12/296837
DATED : January 28, 2014
INVENTOR(S) : James L. Wienhold It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1373 days.

Signed and Sealed this
Twenty-second Day of September, 2015

Michelle K. Lee
*Director of the United States Patent and Trademark Office*